United States Patent
Kamada

(10) Patent No.: US 8,134,656 B2
(45) Date of Patent: Mar. 13, 2012

(54) BACKLIGHT DEVICE, DISPLAY DEVICE, AND TELEVISION RECEIVER

(75) Inventor: Kentaro Kamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 407 days.

(21) Appl. No.: 12/447,981

(22) PCT Filed: Jun. 13, 2007

(86) PCT No.: PCT/JP2007/061881
§ 371 (c)(1),
(2), (4) Date: Apr. 30, 2009

(87) PCT Pub. No.: WO2008/065766
PCT Pub. Date: Jun. 5, 2008

(65) Prior Publication Data
US 2010/0066945 A1    Mar. 18, 2010

(30) Foreign Application Priority Data
Nov. 29, 2006   (JP) .................................. 2006-321160

(51) Int. Cl.
*G02F 1/1335* (2006.01)
(52) U.S. Cl. ......................................................... 349/64
(58) Field of Classification Search ...................... 349/64
See application file for complete search history.

(56) References Cited

U.S. PATENT DOCUMENTS

| 7,804,564 | B2* | 9/2010 | Min et al. ....................... 349/112 |
| 2002/0097578 | A1 | 7/2002 | Greiner |
| 2003/0174106 | A1 | 9/2003 | Tanada et al. |
| 2006/0146562 | A1* | 7/2006 | Ko et al. .......................... 362/561 |
| 2006/0197888 | A1* | 9/2006 | Huang et al. ..................... 349/64 |
| 2007/0030415 | A1* | 2/2007 | Epstein ........................... 349/64 |

FOREIGN PATENT DOCUMENTS

| JP | 3000560 U | 8/1994 |
| JP | 09-222602 A | 8/1997 |
| JP | 11-223812 A | 8/1999 |
| JP | 2003-005179 A | 1/2003 |
| JP | 2004-127680 A | 4/2004 |
| JP | 2004-139876 A | 5/2004 |
| JP | 2006-220778 A | 8/2006 |

OTHER PUBLICATIONS

Official Communication issued in International Patent Application No. PCT/JP2007/061881, mailed on Jul. 31, 2007.

* cited by examiner

*Primary Examiner* — Sung Pak
(74) *Attorney, Agent, or Firm* — Keating & Bennett, LLP

(57) ABSTRACT

A backlight device is provided with a cold cathode fluorescent tube as a first light source that emits light of green, and a cold cathode fluorescent tube as a second light source that can be switched on independently from the first light source and emits light of red and blue. A diffusion member provided on the light source side of a diffusion plate is disposed opposite to the first light source so as to diffuse green light.

18 Claims, 15 Drawing Sheets

BACKLIGHT DEVICE, DISPLAY DEVICE, AND TELEVISION RECEIVER

BACKGROUND OF THE INVENTION

1. Field of the Invention

The present invention relates to a backlight device, and further to a display device and a television receiver including the same.

2. Description of the Related Art

In recent years, a display device that includes a liquid crystal panel as a flat display portion and has many advantages such as thinness and light weight over conventional cathode ray tubes, as typified by a liquid crystal display device, has been becoming the mainstream of a home television receiver, for example. Such a liquid crystal display device includes a backlight device and the liquid crystal panel. The backlight device emits light, and the liquid crystal panel displays desired images by functioning as a shutter with respect to light from a light source provided in the backlight device. The television receiver is configured to display information such as characters and images included in the video signals of a television broadcast on the display surface of the liquid crystal panel.

Furthermore, the above backlight device is classified roughly into a direct type and an edge-light type depending upon the arrangement of the light source with respect to the liquid crystal panel. In the liquid crystal display device including a liquid crystal panel of 20 inches or more, the direct type backlight device is used generally because it can facilitate an increase in brightness and size compared with the edge-light type. More specifically, the direct type backlight device has a configuration in which plural light sources are disposed on a back (non-display surface) side of the liquid crystal panel, and the light sources can be disposed immediately on a reverse side of the liquid crystal panel, which enables a number of light sources to be used. Thus, the direct type backlight device is likely to have high brightness and to be suitable for increasing the brightness and the size. Furthermore, the direct type backlight device has a hollow structure and therefore is light-weight even if it is enlarged. In this regard, the direct type backlight device is suitable for increasing the brightness and the size.

In such a conventional backlight device as described above, a cold cathode fluorescent tube (CCFT) or a light emitting diode (LED) has been used as the light source. The liquid crystal display device provided with color filters of colors of RGB (red (R), green (G), and blue (B)) so as to be color-displayable is required to allow light having all wavelengths in the visible region, namely white light, to be incident upon the liquid crystal panel. Therefore, in the backlight device used in the color displayable liquid crystal display device, a three-band tube or a four-band tube is typically used as a CCFT light source.

Here, the three-band tube is a fluorescent tube having wavelengths of red, green, and blue, while the four-band tube is a fluorescent tube having wavelengths of red, green, blue, and deep red. In the case of the three-band tube, red, green, and blue phosphors are sealed in the tube. In the case of the four-band tube, red, green, blue, and deep red phosphors are sealed in the tube. In either of these cases, at the time of lighting, mixing of light of the respective wavelengths occurs, so that the liquid crystal panel is irradiated with the light (white light) having an emission spectrum in all wavelength regions.

Further, in the case where LEDs are used as the light source, a light-guiding plate, a prism sheet, and the like are used to mix the respective color lights outputted from a red LED, a green LED, and a blue LED (a white LED further may be used) so as to form uniform white light, with which the liquid crystal panel then is irradiated.

However, in the case where light sources having respective wavelength regions of red, green, and blue as described above are used in the conventional backlight device, the following problem arises: color purity decreases due to the interaction with the color filters of colors of RGB provided in the liquid crystal panel.

With reference to FIGS. 14 and 15, the decrease in color purity will be described more specifically.

FIG. 14 is a spectrum diagram showing spectral transmission characteristics of color filters of three colors of RGB. As shown in FIG. 14, the respective spectral transmission spectra of the blue color filter and the green color filter have an overlapped area in the range of about 470 nm to 570 nm. Further, the respective spectral transmission spectra of the green color filter and the red color filter also have an overlapped area in the range of about 575 nm to 625 nm. Because of this, in the case where a light source having emission spectra in all wavelength regions is used, mixing of colors occurs in these overlapped areas, resulting in a problem of decrease in color purity.

For example, FIG. 15A is a spectrum diagram showing an emission spectrum of a three-band tube; FIG. 15B is a spectrum diagram showing a spectral transmission characteristic of a red color filter in the case where this three-band tube is used as a light source; FIG. 15C is a spectrum diagram showing a spectral transmission characteristic of a green color filter in the case where this three-band tube is used as the light source; and FIG. 15D is a spectrum diagram showing a spectral transmission characteristic of a blue color filter in the case where this three-band tube is used as the light source.

As can be seen from FIG. 15C, a spectral transmission curve of the green color filter partially overlaps a wavelength region of blue. This means that a blue component is mixed into light from a pixel that is to be displayed in green. Further, as can be seen from FIG. 15D, a spectral transmission curve of the blue color filter also partially overlaps a wavelength region of green. This means that a green component is mixed into light from a pixel that is to be displayed in blue. Such color mixing phenomenon also occurs in the case where a four-band tube is used as a light source, and the phenomenon has been a cause of deterioration in color purity.

In a conventional backlight device, as described in JP 2003-271100 A for example, a driving method (so-called field sequential driving) has been proposed in which LEDs of three colors of RGB are used as light sources with respect to the liquid crystal display device provided with color filters of three colors of RGB, and the LEDs of the respective colors are caused to blink sequentially so that an image of red alone, an image of green alone, and an image of blue alone are displayed in order in one frame. This conventional example has been thought to be capable of reducing brightness irregularities of respective colors of RGB and improving color purity.

However, the above conventional structure has a problem in that when a frame rate is increased, as in the case where display of high-resolution moving images is performed, the field sequential drive in which a display is performed in such a manner that one frame is divided into three colors becomes difficult. Particularly, in the case of the liquid crystal display device, at least presently, a response speed of liquid crystal is not sufficiently high, making it almost impossible to realize high-quality display of moving images by the field sequential drive.

Therefore, the following has been studied: in place of three types of light sources of RGB, two types of light sources that respectively emit lights of two colors mixable into white color light are used and the display is performed by dividing one frame into two in order that high-quality display of moving images can be achieved with the present response speed of liquid crystal.

However, in the case where the display is performed by using two types of light sources and dividing frames as described above, it is required to switch on respective light sources alternately. Accordingly, this causes a problem that light from light sources of one of the two types tends to be emphasized to a user's eye due to the persistence of vision, thereby being recognized as brightness irregularities. Especially in the case where the liquid crystal panel is fully or partially displayed in white, a problem that either of the above light sources is recognized as an image, i.e., a so-called lamp image, tends to occur, which could cause a significant decline in luminous quality.

As described above, in the conventional backlight device, a problem of the decline in luminous quality arises when both of an improvement in color purity and a configuration corresponding with high-quality display of moving images are pursued at the same time.

SUMMARY OF THE INVENTION

In view of the foregoing problems, preferred embodiments of the present invention provide a backlight device that is capable of improving color purity and corresponding with high-quality display of moving images while preventing a decline in luminous quality. In addition, other preferred embodiments of the present invention provide a display device and a television receiver including such a backlight device.

A backlight device according to a preferred embodiment of the present invention includes: a plurality of light sources; and a diffusion plate arranged to diffuse light from the plurality of light sources, wherein the plurality of light sources include: a first light source that emits light of a first color; and a second light source that is configured so as to be switched independently from the first light source and emits light of a second color complementary to the first color. The backlight device further includes a diffuser that is provided on at least one side of a light source side and a non-light source side of the diffusion plate so as to diffuse the light of the first color or the light of the second color.

The backlight device with the above configuration includes the first light source and the second light source that emit light of the first color and light of the second color, respectively, which are complementary to each other, and that can be switched independently of each other. Thus, the backlight device can improve color purity and correspond with high-quality display of moving images. Besides, since the diffuser diffuses light of the first color or light of the second color, it is possible to prevent either of the first color or the second color from becoming particularly visible even when the backlight device is made to correspond with high-quality display of moving images. Therefore, the backlight device can prevent luminous quality from declining.

In the above backlight device, the diffuser is preferably disposed opposite to the first light source or the second light source.

In this case, light of the first color or light of the second color can be diffused at the diffuser without fail, whereby the luminous quality can surely be prevented from declining.

Further, in the above-described backlight device, the diffuser may be disposed on a straight line falling on the first light source or the second light source, with the diffusion plate being interposed therebetween.

In this case, since the diffuser diffuses the light of the first color or the light of the second color diffused by the diffusion plate, the luminous quality can surely be prevented from declining.

Still further, in the above-described backlight device, the diffuser is preferably integral with the diffusion plate.

In this case, the diffuser and the diffusion plate can be installed at once in the backlight device, and operations for the assembly of the backlight device can be simplified easily.

Still further, in the above-described backlight device, the diffuser is preferably provided in the inside of the diffusion plate by setting a diffuse transmittance at a portion of the diffusion plate opposite to the first light source or the second light source smaller than a diffuse transmittance at the other portion.

In this case, the diffusion plate incorporating the diffuser is configured, and this makes it easier to install the diffuser in the backlight device and to simplify operations the assembly of the backlight device. Moreover, since a separate space where the diffuser is to be provided is not needed, an increase in the size of the backlight device due to the provision of the diffuser can be prevented.

Still further, in the above-described backlight device, the diffusion plate preferably is made of polycarbonate or methyl methacrylate styrene copolymer.

In this case, the diffusion plate to be used has advantages in costs, transmittance, and workability, which makes it easier to reduce costs and improve performance of the backlight device.

Still further, in the above-described backlight-device, the diffusion plate may be provided with a lens structure.

In this case, an improvement in the front brightness of the light coming through the diffusion plate is to be achieved by the lens structure, and hence, the backlight device can be configured to exhibit high performance.

Still further, in the above-described backlight device, the diffusion plate preferably is provided with a reflection layer interposed between the lens structure and a main body of the diffusion plate.

In this case, the front brightness of light coming through the diffusion plate can be improved by the lens structure, while the light utilization efficiency can be improved by the reflection layer. Thus, the backlight device can easily be configured to exhibit high performance.

Still further, in the above-described backlight device, the light of the first color may mainly have a spectrum in a wavelength region of green, and the light of the second color may mainly have spectra in wavelength regions of red and blue.

In this case, the mixing of light of green and light of blue can be prevented, whereby the color purity can surely be prevented from declining.

Still further, in the above-described backlight device, the light of the first color may mainly have a spectrum in a wavelength region of blue, and the light of the second color may mainly have spectra in wavelength regions of red and green.

In this case, the mixing of light of green and light of blue can be prevented, whereby the color purity can surely be prevented from declining.

Still further, in the above-described backlight device, the first light source and the second light source may be cold cathode fluorescent tubes or hot cathode fluorescent tubes.

In this case, the backlight device can be configured easily to be a low-cost, low-power-consumption backlight device.

Still further, in the above-described backlight device, the first light source and the second light source preferably are cold cathode fluorescent tubes with a diameter of about 3 mm to about 4 mm, for example.

In this case, since cold cathode fluorescent tubes having an excellent light emission efficiency are used as the first light source and the second light source, the backlight device can be configured more easily to be a low-cost, low-power-consumption backlight device.

Still further, in the above-described backlight device, the first light source and the second light source preferably are hot cathode fluorescent tubes with a diameter of about 5 mm to about 26 mm, for example.

In this case, since hot cathode fluorescent tubes having an excellent light emission efficiency are used as the first light source and the second light source, the backlight device can be configured more easily to be a low-cost, low-power-consumption backlight device.

Still further, in the above-described backlight device, a plurality of the first light sources and a plurality of the second light sources may be provided, and the first light sources and the second light sources may be arranged alternately, one or more by one or more.

In this case, the backlight device can be configured to have a high brightness, and any decline of the luminous quality can be prevented more easily, as compared with the case where the first light sources and second light sources are arranged in respective groups.

Still further, in the above-described backlight device, the first light source may be a green light emitting diode, and the second light source may be formed with a combination of a red light emitting diode and a blue light emitting diode that emits light at the same time when the red light emitting diode emits light.

In this case, the mixing of light of green and light of blue can be prevented, whereby the color purity can surely be prevented from declining.

Still further, in the above-described backlight device, the first light source may be a blue light emitting diode, and the second light source may be formed with a combination of a red light emitting diode and a green light emitting diode that emits light at the same time when the red light emitting diode emits light.

In this case, the mixing of light of green and light of blue can be prevented, whereby the color purity can surely be prevented from declining.

Still further, in a display device according to a preferred embodiment of the present invention, the backlight device according to any one of the above-described preferred embodiments is preferably used.

Since the backlight device capable of improving the color purity, corresponding with the high-quality display of moving images, and preventing the luminous quality from declining is used therein, the display device configured as described above can be configured easily to be capable of performing high-quality display of moving images, and to have an excellent display quality.

Still further, in a television receiver according to another preferred embodiment of the present invention, the above-described display device is used.

The television receiver configured as described above can be configured easily to be a high-performance television receiver, since the display device capable of performing high-quality display of moving images and having an excellent display quality is used therein.

With various preferred embodiments of the present invention, it is possible to provide a backlight device capable of improving the color purity, corresponding with the high-quality display of moving images, and preventing the luminous quality from declining; a display device including the same; and a television receiver including the same.

Other features, elements, arrangements, steps, characteristics and advantages of the present invention will become more apparent from the following detailed description of preferred embodiments of the present invention with reference to the attached drawings.

BRIEF DESCRIPTION OF THE DRAWINGS

FIG. 6C is a spectrum diagram showing a spectral characteristic of light that is transmitted through a pixel corresponding to a red color filter when the cold cathode florescent tubes 9RB are switched on; FIG. 6D is a spectrum diagram showing a spectral characteristic of light that is transmitted through a pixel corresponding to a green color filter when the cold cathode fluorescent tubes 9G are switched on; and FIG. 6E is a spectrum diagram showing a spectral characteristic of light that is transmitted through a pixel corresponding to a blue color filter when the cold cathode fluorescent tubes 9RB are switched on.

FIG. 8A is a diagram illustrating lamp images occurring in a light-emitting surface of the backlight device when the diffusion member is not provided; and FIG. 8B is a diagram illustrating the light-emitting surface when the diffusion member is provided.

DETAILED DESCRIPTION OF THE PREFERRED EMBODIMENTS

Hereinafter, preferred embodiments of a backlight device of the present invention as well as a display device and a television receiver using the same will be described with reference to the drawings. It should be noted that a case where the present invention is applied to a transmission-type liquid crystal display device is described below by way of example.

First Preferred Embodiment

Figure 1:
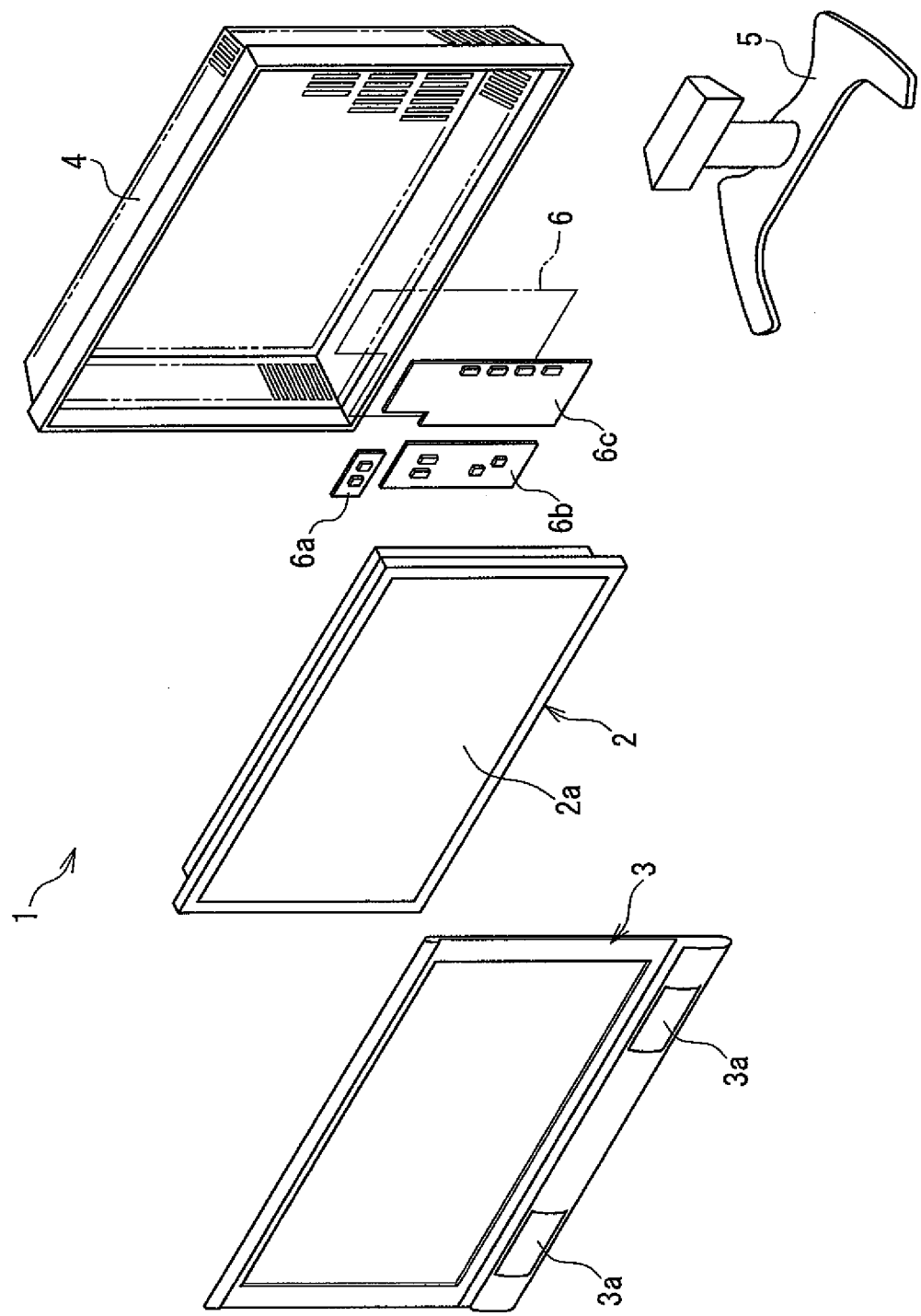
FIG. 1 is an exploded perspective view illustrating a television receiver and a liquid crystal display device according to First Preferred Embodiment of the present invention.

FIG. 1 is an exploded perspective view illustrating a television receiver and a liquid crystal display device according to First Preferred Embodiment of the present invention. In FIG. 1, a television receiver 1 of the present preferred embodiment is provided with a liquid crystal display device 2 as a display device and is configured to be capable of receiving a television broadcast by means of an antenna, a cable (not shown), and the like. The liquid crystal display device 2, housed within a front cabinet 3 and a back cabinet 4, is set upright by using a stand 5. Further, in the television receiver 1, a display surface 2a of the liquid crystal display device 2 is configured to be visible via the front cabinet 3. The liquid crystal display device 2 is supported by the stand 5 in such a manner that this display surface 2a is parallel or substantially parallel to the direction of gravitational force (vertical direction).

In the television receiver 1, between the liquid crystal display device 2 and the back cabinet 4, there also are provided a TV tuner circuit board 6a, a control circuit board 6b for controlling each portion of the television receiver 1 such as a backlight device to be described later, and a power supply circuit board 6c, which are mounted on a support plate 6. Further, in the television receiver 1, images corresponding to video signals of the television broadcast received by the TV tuner on the TV tuner circuit board 6a are displayed on the display surface 2a, while audio is reproduced and outputted from speakers 3a mounted on the front cabinet 3. It should be noted that a number of air holes are formed on the back cabinet 4 so as to appropriately release heat generated in the backlight device, a power source, and the like.

Next, the liquid crystal display device 2 will be described specifically with reference to FIG. 2.

Figure 2:
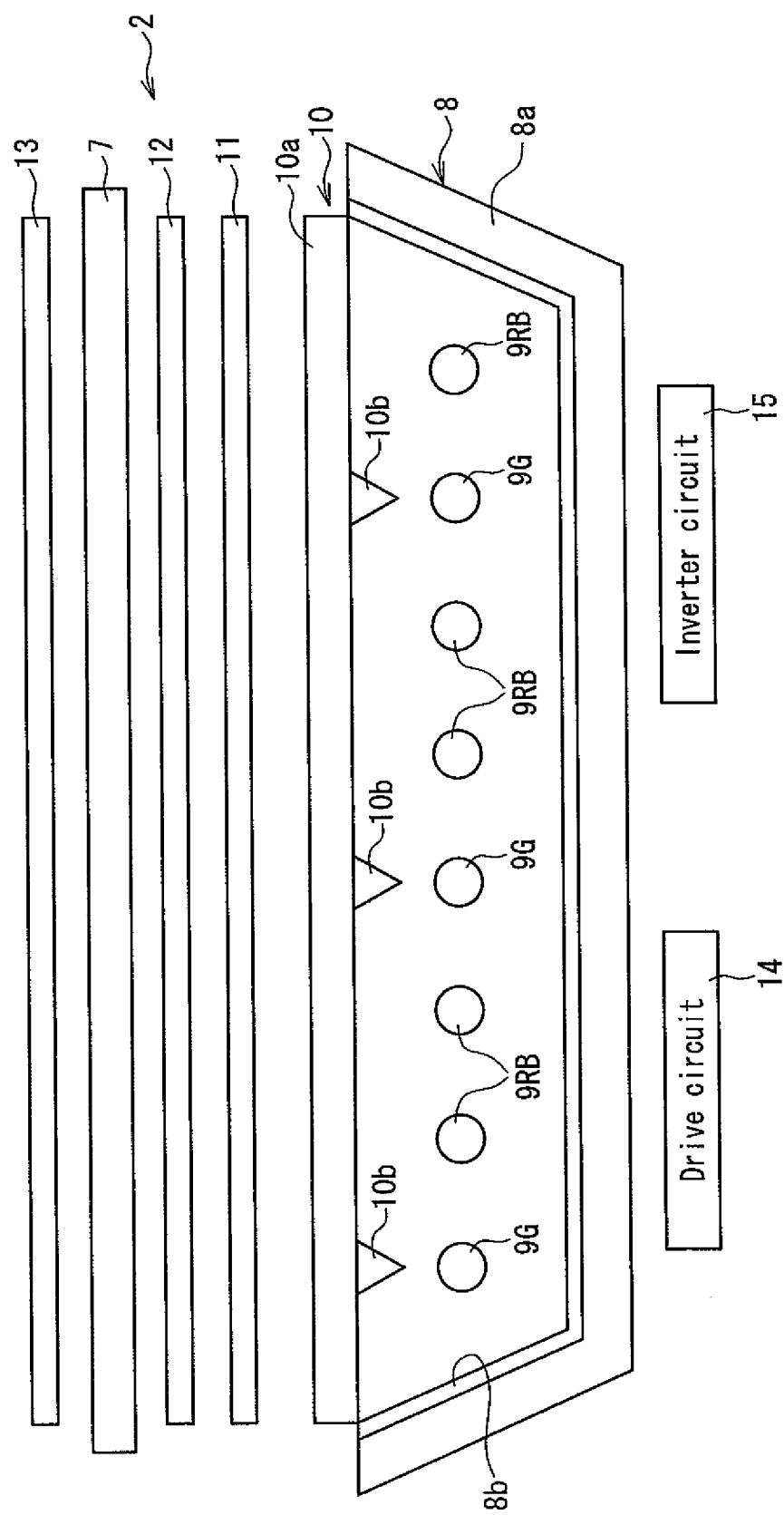
FIG. 2 is a diagram illustrating a configuration of main portions of the liquid crystal display device.

FIG. 2 is a diagram illustrating a configuration of main portions of the liquid crystal display device. In FIG. 2, the liquid crystal display device 2 includes a liquid crystal panel 7 and a backlight device 8. The liquid crystal panel 7, as a display portion, displays information such as characters and images. The backlight device 8 is disposed on a non-display surface side (lower side of FIG. 2) of the liquid crystal panel 7 and generates illumination light to illuminate the liquid crystal panel 7. The liquid crystal panel 7 and the backlight device 8 are integrated so as to form the liquid crystal display device 2 of a transmission type. In the liquid crystal display device 2, a pair of polarizing plates 12 and 13 is disposed on the non-display surface side and the display surface side of the liquid crystal panel 7, respectively, in such a manner that transmission axes thereof are arranged in crossed-Nicols.

The backlight device 8 includes a bottom casing 8a and a plurality of cold cathode fluorescent tubes 9G and 9RB (hereinafter referred to with a generic reference numeral "9") housed in the casing 8a. On inner surfaces of the casing 8a, there are provided, for example, a reflection sheet 8b that reflects light from the cold cathode fluorescent tubes 9 to the liquid crystal panel 7 side, thus improving light utilization efficiency of the cold cathode fluorescent tubes 9.

Each cold cathode fluorescent tube 9 is straight-tube type, and electrode portions (not shown) provided at both ends thereof are supported on an outer side of the casing 8a. Furthermore, each cold cathode fluorescent tube 9 also is configured to have a small diameter of about 3.0 mm to about 4.0 mm, for example, so as to have excellent light-emission efficiency. Each cold cathode fluorescent tube 9 is held inside the casing 8a with a light source holder (not shown) while the distances from each cold cathode fluorescent tube 9 to the diffusion plate 10 and to the reflection sheet 8b are kept at predetermined distances. Furthermore, the cold cathode fluorescent tubes 9 are arranged so that the longitudinal direction thereof is parallel or substantially parallel to a direction perpendicular to the direction of gravity. This arrangement can prevent mercury (vapor) sealed in each cold cathode fluorescent tube 9 from being concentrated at one end of the cold cathode fluorescent tube 9 in the longitudinal direction due to the action of gravity, resulting in significantly improved lamp life.

In the cold cathode fluorescent tubes 9G, a green phosphor (for example, "NP-108" manufactured by Nichia Corporation) is sealed so that the emission spectrum has a peak in a wavelength region of green (for example, in the vicinity of 516 nm), thus constituting a first light source that emits light of green as light of a first color.

On the other hand, in the cold cathode fluorescent tubes 9RB, red and blue phosphors (for example, "NP-320" and "NP-103" manufactured by Nichia Corporation) are sealed so that the emission spectrum has peaks in a wavelength region of red (for example, in the vicinity of 658 nm) and in a wavelength region of blue (for example, in the vicinity of 447 nm), thus constituting a second light source that emits light of red and blue as light of a second color.

As illustrated in an example of FIG. 2, the backlight device 8 preferably includes three cold cathode fluorescent tubes 9G and five cold cathode fluorescent tubes 9RB. They are arranged in such a manner that two juxtaposed cold cathode fluorescent tubes 9RB are disposed in each space between two adjacent cold cathode fluorescent tubes 9G so as to make an alternate arrangement of the cold cathode fluorescent tubes 9G and 9RB. These cold cathode fluorescent tubes 9G and 9RB are arranged so that the longitudinal direction thereof is parallel or substantially parallel to an extending direction of the scanning lines of the liquid crystal panel 7 and so as to keep equal distances respectively. By providing a plurality of cold cathode fluorescent tubes 9G and 9RB as above, the backlight device 8 having high brightness can easily be formed. Further, the alternate arrangement of the cold cathode fluorescent tubes 9G and 9RB makes it easier to prevent the luminous quality from declining, compared to the case where the cold cathode fluorescent tubes 9G and 9RB are arranged in respective groups.

Other than the configuration described above, another example may be used in which the cold cathode fluorescent tubes 9G and the cold cathode fluorescent tubes 9RB may be arranged so as to alternate with each other one by one. Alternatively, the cold cathode fluorescent tubes 9G and the cold cathode fluorescent tubes 9RB may be arranged so as to alternate with each other in sets of a plural number (for example, two) of the cold cathode fluorescent tubes 9G and 9RB.

The number of the cold cathode fluorescent tubes 9 can vary appropriately in accordance with the screen size of the liquid crystal display device 2, the brightness of each fluorescent tube, a desired color balance, and the like. As one example, in the case where the liquid crystal display device 2 has a screen size of a so-called 37V type and uses, as described above, the cold cathode fluorescent tubes 9G having an emission peak in green (in the vicinity of 516 nm) and the cold cathode tubes 9RB having peaks in red (in the vicinity of 658 nm) and in blue (in the vicinity of 447 nm), in order to realize a white display, it is preferable to have a configuration that includes about eighteen cold cathode fluorescent tubes in total consisting of four cold cathode fluorescent tubes 9G and fourteen cold cathode fluorescent tubes 9RB.

An outer side of the casing 8a, there is a drive circuit 14 that drives the liquid crystal panel 7 and an inverter circuit 15 that switches on each of a plurality of cold cathode fluorescent tubes 9 at high frequency with an inverter. Both the drive circuit 14 and the inverter circuit 15 are mounted on the control circuit board 6b (FIG. 1) and disposed opposite to the outer side of the casing 8a. The inverter circuit 15 is configured to switch on the cold cathode fluorescent tube 9G and 9RB alternately (as will hereinafter be described in detail).

Further, the backlight device 8 includes a diffusion plate 10 that is disposed so as to cover an opening of the casing 8a and an optical sheet 11 that is disposed above the diffusion plate 10. The diffusion plate 10 is made up of, for example, a rectangular-shaped synthetic resin or a glass material having a thickness of about 2 mm. More specifically, the diffusion plate 10 preferably includes polycarbonate or methyl methacrylate styrene copolymer, for example. Thus, the diffusion plate 10 to be used will have advantages in costs, transmittance, and workability, which makes it easier to reduce costs and improve performance of the backlight device 8. The diffusion plate 10 is held movable on the casing 8a, so that even when elastic (plastic) deformation occurs on the diffusion plate 10 due to impact of heat, caused by heat generation of the cold cathode fluorescent tubes 9 and temperature rise inside the casing 8a, the diffusion plate 10 can absorb such deformation by moving on the casing 8a.

For diffusing light of green from each of the cold cathode fluorescent tubes 9G, the diffusion plate 10 is provided with a diffuser in an integrated manner. More specifically, the diffusion plate 10 includes a flat main body 10a and triangular-shaped diffusion members 10b as the diffuser. The diffusion plate main body 10a diffuses light from the cold cathode fluorescent tubes 9 (including light reflected at the reflection sheet 8b) and outputs the light to a side of the optical sheet 11.

Further, the diffusion members 10b are mounted on a side of the cold cathode fluorescent tubes 9G of the diffusion plate main body 10a and disposed so as to face the cold cathode fluorescent tubes 9G. More specifically, as the diffusion members 10b, bars having triangular-shaped cross-sections are provided along a longitudinal direction of the cold cathode fluorescent tubes 9G and disposed so as to oppose the cold cathode fluorescent tubes 9G, whereby the diffusion members 10b mainly diffuse light of green from the cold cathode fluorescent tubes 9G. Thus, as described later in detail, the diffusion members 10b are configured to diffuse light of green, which is relatively more visible to the user's eye, so as to prevent lamp images from occurring.

The optical sheet 11 includes a diffusion sheet formed of, for example, a synthetic resin film having a thickness of about 0.2 mm and is configured so as to improve display quality on the display surface of the liquid crystal panel 7 by diffusing the above illumination light toward the liquid crystal panel 7 appropriately. Further, on the optical sheet 11, commonly-known optical sheet materials such as a prism sheet, a polarizing reflection sheet and the like are laminated suitably as required for the purpose of, for example, improving display quality on the display surface of the liquid crystal panel 7. The optical sheet 11 is configured so as to convert plane-shaped light outputted from the diffusion plate 10 into plane-shaped light having an almost uniform brightness not lower than a predetermined brightness (for example, 10,000 cd/m$^2$) and make it incident as illumination light upon the liquid crystal panel 7. In addition to the above-described configuration, for example, optical members such as a diffusion sheet and the like for adjusting a viewing angle of the liquid crystal panel 7 may be laminated suitably above the liquid crystal panel 7 (on the display surface side).

Figure 3:
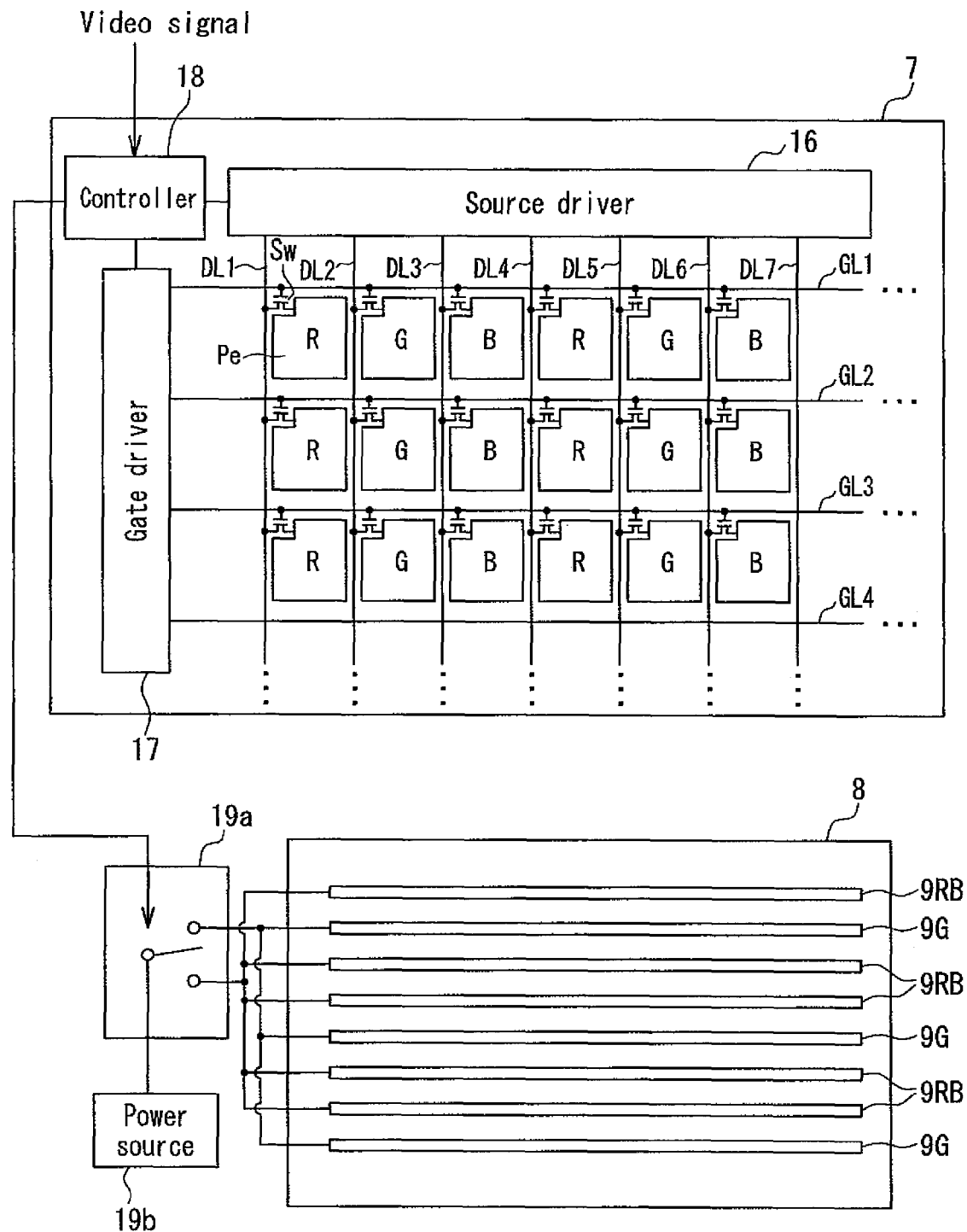
FIG. 3 is a block diagram showing a functional configuration of the liquid crystal display device.

In the following, the configurations of the liquid crystal panel 7 and the backlight device 8, in the liquid crystal display device 2 and methods of driving them will be described in more detail with reference to FIG. 3. FIG. 3 is a diagram schematically showing a functional relationship between the liquid crystal panel 7 and the backlight device 8, but is not intended to faithfully represent the physical sizes of the liquid crystal panel 7 and the backlight device 8.

The liquid crystal panel 7 is a liquid crystal display element of an active matrix type, and is provided with a plurality of scanning lines GL1, GL2, GL3, . . . (hereinafter referred to with a generic reference numeral "GL") and a plurality of data lines of DL1, DL2, DL3, . . . (hereinafter referred to with a generic reference numeral "DL") formed in matrix as shown in FIG. 3; thin film transistors (hereinafter referred to as "TFT") Sw as switching elements disposed at intersections of the scanning lines GL and the data lines DL; and pixel electrodes Pe connected to drain electrodes of the TFT Sw.

Moreover, the liquid crystal panel 7 includes a gate driver 17 that sequentially supplies a selection signal to the scanning lines GL, a source driver 16 that supplies a data signal to each of the data lines DL, and a controller 18 that supplies a clock signal, a timing signal and the like to the source driver 16, the gate driver 17 and the like. The source driver 16, the gate driver 17, and the controller 18 are included in the drive circuit 14 (FIG. 2).

Furthermore, the liquid crystal display device 2 includes a switch circuit 19a that controls switching on/off of the cold cathode fluorescent tubes 9G and 9RB of the backlight device 8 in accordance with, for example, a timing signal supplied from the controller 18. The switch circuit 19a controls switching on/off of the cold cathode fluorescent tubes 9G and 9RB through ON/OFF of voltage supply from an alternating-current power source 19b or the like to the cold cathode fluorescent tubes 9G and 9RB. Further, the switch circuit 19a is included in the inverter circuit 15 (FIG. 2) and configured so that ON/OFF of all the three cold cathode fluorescent tubes 9G are controlled simultaneously, and ON/OFF of all the five cold cathode fluorescent tubes 9RB also are controlled simultaneously.

The configurations of the drivers and controller shown in FIG. 3 are merely illustrative, and modes of mounting these driving system circuits are arbitrary. For example, these driving system circuits may be provided so that at least a portion of them is formed monolithically on an active matrix substrate; they may be mounted as semiconductor chips on a substrate; or alternatively, they may be connected as external circuits of the active matrix substrate. Further, the switch circuit 19a may be provided on either of the liquid crystal panel 7 or the backlight device 8.

On a counter substrate (not shown) facing this active matrix substrate, the color filters of three colors of RGB are formed in stripes. In FIG. 3, the colors of the color filters corresponding respectively to pixels are denoted by characters "R", "G", and "B". Thus, as shown in FIG. 3, all of pixels in one column connected to the same data line DL display one of the RGB colors. For example, in FIG. 3, all of pixels connected to the data line DL1 display red. Although the color filters described herein are in a stripe arrangement, other types of arrangements such as a delta arrangement also may be adopted.

In the liquid crystal panel 7 configured as above, when a gate pulse (selection signal) at a predetermined voltage is applied sequentially to the scanning lines GL1, GL2, GL3, GL4, . . . , the TFT Sw connected to one of the scanning lines GL, to which the gate pulse has just been applied, is brought to an ON state, and a value of a gradation voltage that has been applied to a corresponding one of the data lines DL at that point in time is written into the each of the TFTs Sw. Consequently, a potential of the pixel electrode Pe connected to a drain electrode of the each of the TFTs Sw becomes equal to the value of the gradation voltage of the corresponding one of the data lines DL. As a result of this, an alignment of liquid crystal interposed between the pixel electrode Pe and the above opposing electrode changes in accordance with the value of the gradation voltage, and thus a gradation display of the pixel is realized. On the other hand, during a time period in which a non-selection voltage is applied to the scanning lines GL, the TFTs Sw are brought to an OFF state, so that the potential of the pixel electrode Pe is maintained at a value of a potential applied thereto at the time of writing.

Figure 4:
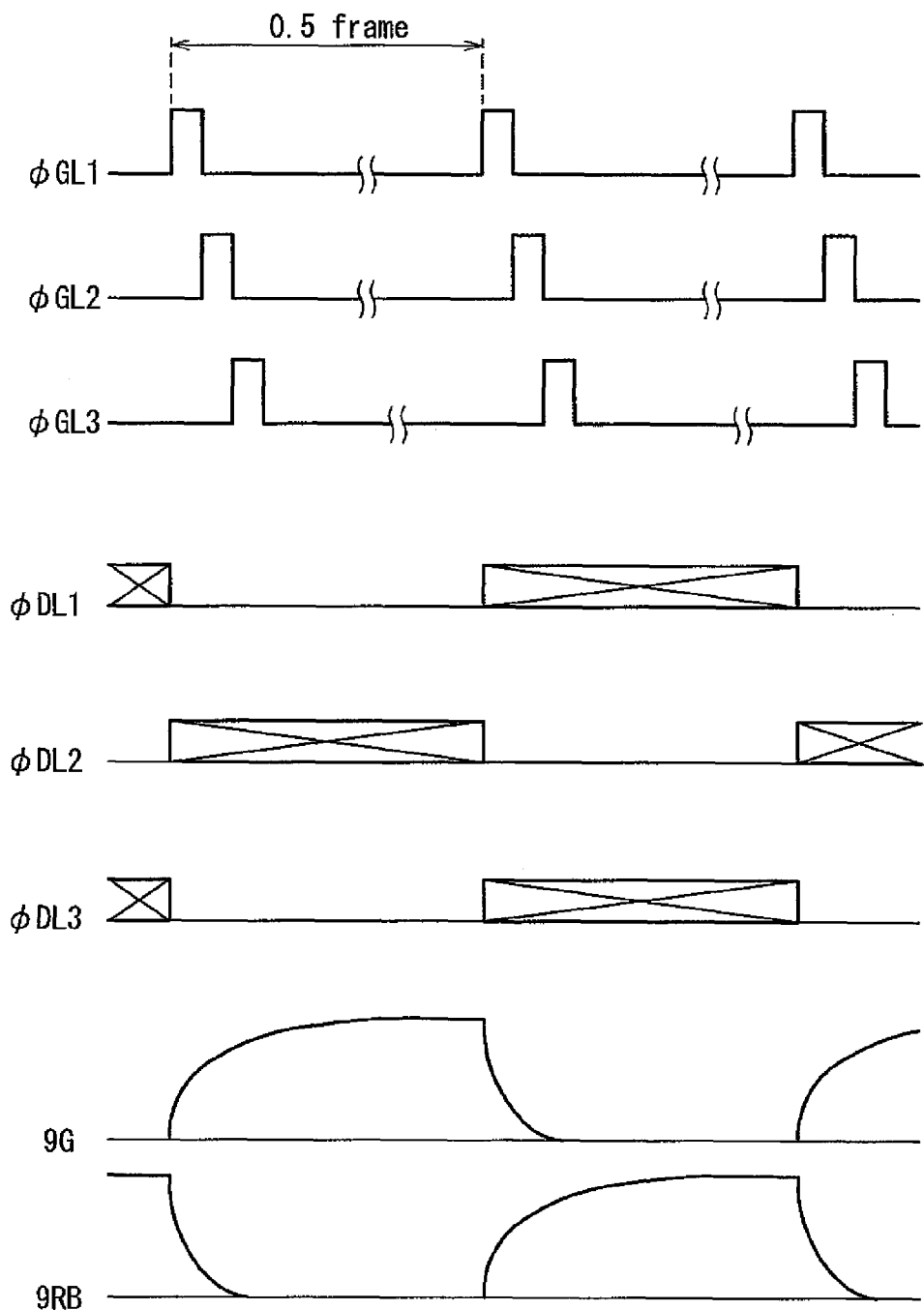
FIG. 4 is a timing chart showing an exemplary relationship among timing for switching on/off the light sources, timing for supplying a data signal to each of the data lines, and amounts of light emitted by the light sources in the liquid crystal display device.

In the liquid crystal display device 2 according to the present preferred embodiment, which is configured as above, as shown in FIG. 4, the gate driver 17 applies the gate pulse to each of the scanning lines GL at a cycle of ½ of a time period (one frame time period) in which one image is displayed in the liquid crystal panel 7. Then, at a first half of this one frame time period, the switch circuit 19a switches on the cold cathode fluorescent tubes 9G that emit light of green while switching off the cold cathode fluorescent tubes 9RB. Further, at a latter half of one frame time period, the switch circuit 19a switches off the cold cathode fluorescent tubes 9G while switching on the cold cathode fluorescent tubes 9RB that emit light of red and light of blue. In FIG. 4, the first and second graphs from the bottom show amounts of light emitted by the cold cathode fluorescent tubes 9G and 9RB, respectively.

Furthermore, at the first half of one frame time period, the source driver 16 supplies the data signal to be applied to a pixel of green to each of the data lines DL2, DL5, DL8, . . . that are connected to a group of pixel electrodes Pe among of the pixel electrodes Pe that corresponds to the green color filter. Thus, at the first half of one frame time period, only a portion constituted of pixels of green in one image is displayed.

Furthermore, at the latter half of one frame time period, the source driver 16 supplies the data signal to be applied to a pixel for red to each of the data lines DL1, DL4, DL7, . . . that are connected to a group of pixel electrodes Pe among the pixel electrodes Pe that corresponds to the red color filter, and supplies the data signal to be applied to a pixel of blue to each of the data lines DL3, DL6, DL9, . . . that are connected to a group of pixel electrodes Pe among the pixel electrodes Pe that corresponds to the blue color filter. Thus, at the latter half of one frame time period, only portions constituted of pixels of red and pixels of blue in one image are displayed.

For example, in the case where the data signal is a video signal according to the NTSC standards, the refreshing rate is 60 Hz and the length of one frame time period is 16.7 milliseconds. Therefore, in the case where at the first half of one frame time period, only a portion constituted of pixels of green is displayed, and at the latter half thereof, portions constituted of pixels of red and pixels of blue are displayed as described above, due to the persistence of vision, a resulting image is recognized to the human eye as an image in which three primary colors are mixed.

At the first half of one frame time period, while the cold cathode fluorescent tubes 9G that emit light of green are switched on, the data signal supplied to each of the data lines DL1, DL4, DL7, . . . that are connected to the group of pixel electrodes Pe among the pixel electrodes Pe that corresponds to the red color filter and the data signal supplied to each of the data lines DL3, DL6, DL9, . . . that are connected to the group of pixel electrodes Pe among the pixel electrodes Pe that corresponds to the blue color filter may be maintained at a value of a potential applied in an immediately preceding frame or may have a predetermined potential value. However, it is preferable that these data signals have such a potential value as to cause a black display. This is preferable because the black display allows unwanted leakage light from a pixel portion to be blocked. The following describes reasons why leakage light as described above is generated.

One possible reason is that an ON/OFF signal of the inverter circuit 15 of the cold cathode fluorescent tubes 9 is delayed or dull. That is, when the switching on/off by the switch circuit 19a is controlled depending on whether the switching is performed at the first half or the latter half of one frame time period, if the ON/OFF signal is delayed or dull, there occurs a deviation of timing at which the cold cathode fluorescent tubes 9 actually are switched ON/OFF. Because of this, for example, at an early stage of the first half of the frame, due to light from the cold cathode fluorescent tubes 9RB that are supposed to have been switched off, leakage light from the pixels of red and blue may be generated, though in a small amount. Further, reasons other than the above-described reason include an ON/OFF delay of the cold cathode fluorescent tubes 9. Specifically, the cold cathode fluorescent tube 9 has a characteristic that an amount of light emitted thereby does not immediately change in response to the control of switching on/off. For example, as shown in FIG. 4, when the switching on/off by the switch circuit 19a is controlled depending on whether the switching is performed at the first half or the latter half of one frame time period, an amount of light emitted by either of the cold cathode fluorescent tube 9G and the cold cathode fluorescent tube 9RB that is thereby being switched off does not become zero immediately after the switching by the switch circuit 19a. Because of this, for example, at an early stage of the first half of the frame, due to light from the cold cathode fluorescent tubes 9RB that are supposed to have been switched off, leakage light from the pixels of red and blue may be generated, though in a small amount.

Figure 5:
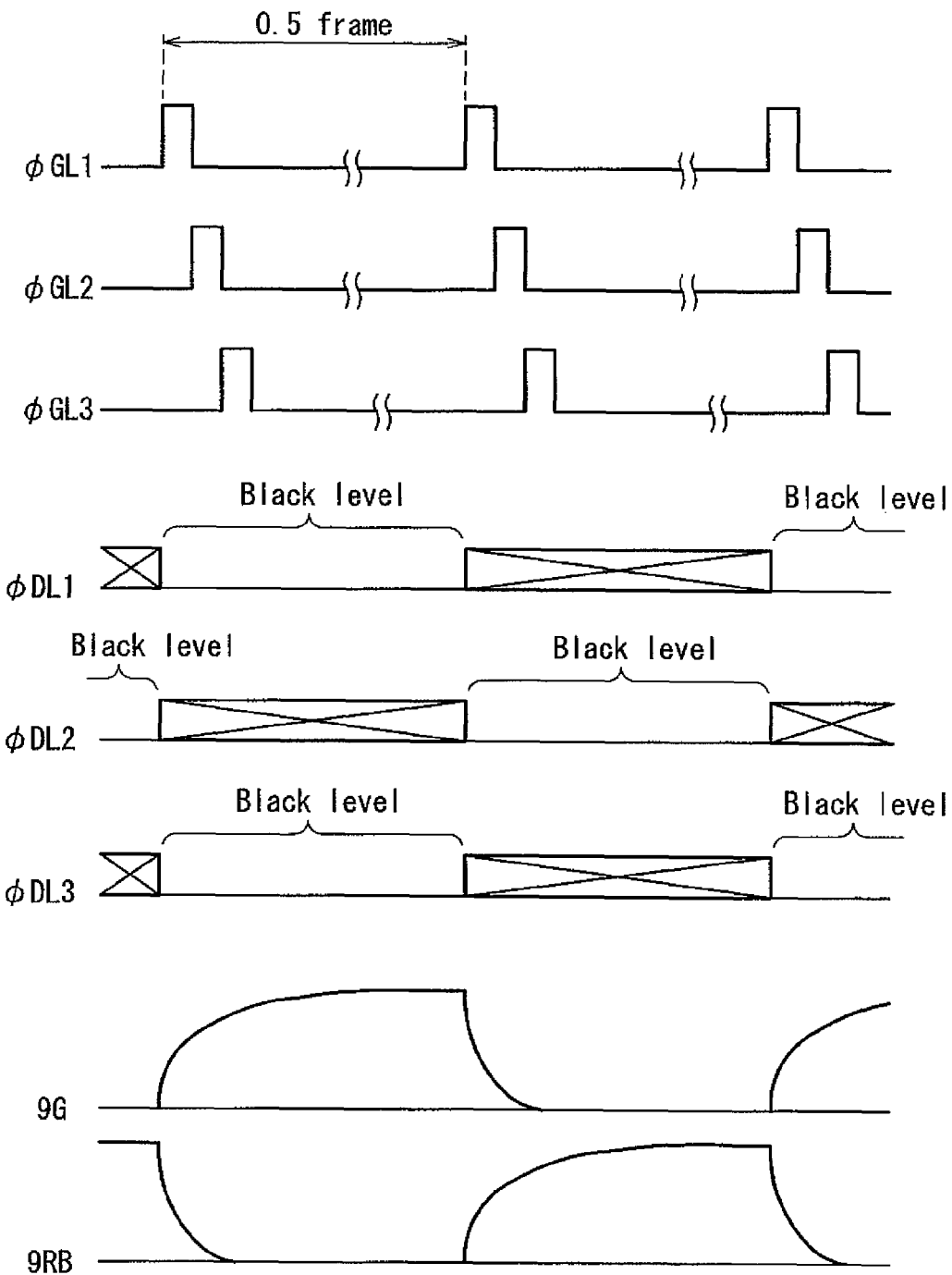
FIG. 5 is a timing chart showing another exemplary relationship among timing for switching on/off the light sources, timing for supplying a data signal to each of the data lines, and amounts of light emitted by the light sources in the liquid crystal display device.

In such a case, as shown in FIG. 5, at the first half of one frame time period, the data signal having such the potential value as to cause the black display is applied to each of the data lines DL1, DL4, DL7, . . . that are connected to the group of pixel electrodes Pe among the pixel electrodes Pe that corresponds to the red color filter and to each of the data lines DL3, DL6, DL9, ... that are connected to the group of pixel electrodes Pe among the pixel electrodes Pe that corresponds to the blue color filter, and thus the generation of such leakage light can be prevented, thereby allowing further improved color purity to be obtained. For the same reason, it is preferable that, at the latter half of one frame time period, the data signal having such the potential value as to cause the black display is supplied to each of the data lines DL2, DL5, DL8, ... that are connected to the group of pixel electrodes Pe among the pixel electrodes Pe that corresponds to the green color filter.

Furthermore, in the case where the above-mentioned black display is performed, the green color filter need not be provided. This is because the following can be achieved by performing the black display: while only a portion constituted of pixels of green in one image is displayed, the portion of the pixels of green is displayed with light of green from the cold cathode fluorescent tubes 9G; while portions constituted of the rest of pixels of red and pixels of blue in one image are displayed, the pixels of green are irradiated with light of red and blue from the cold cathode fluorescent tubes 9RB, but both of light of red and light of blue are not outputted via the pixels of green to the outside, since the black display (insertion of black) is performed in the pixels of green.

The backlight device 8 thus configured according to the present preferred embodiment includes cold cathode fluorescent tubes (first light source) 9G and cold cathode fluorescent tubes (second light source) 9RB, which emit light of green (light of the first color), and light of red and blue (light of the second color), respectively, which are complementary to each other, and can be switched independently from each other. Therefore, the backlight device 8 is capable of improving color purity and corresponding with high-quality display of moving images.

Hereinafter, the description is directed to an effect provided by the configuration according to the present preferred embodiment in comparison with the prior art.

Figure 15A:
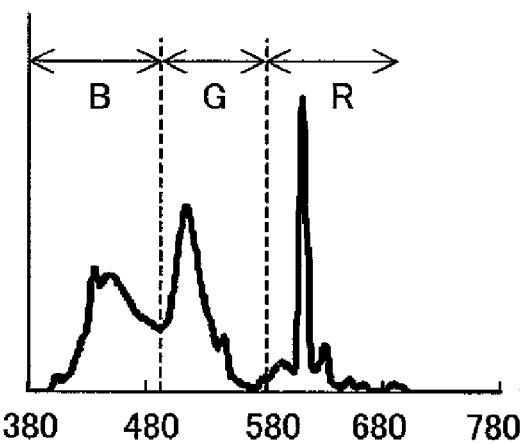
FIG. 15A is a spectrum diagram showing an emission spectrum of a three-band tube.
Figure 15B:
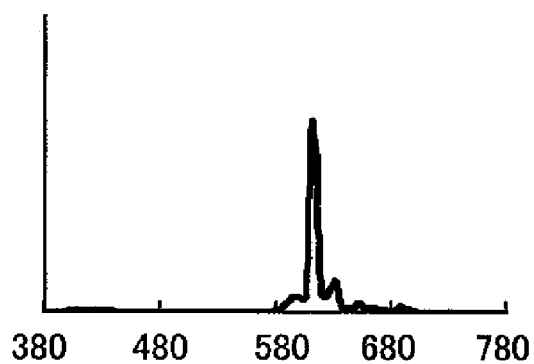
FIG. 15B is a spectrum diagram showing a spectral transmission characteristic of a red color filter in the case where this three-band tube is used as a light source.
Figure 15C:
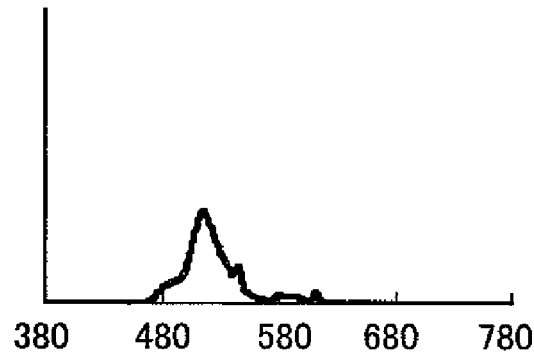
FIG. 15C is a spectrum diagram showing a spectral transmission characteristic of a green color filter in the case where this three-band tube is used as the light source.
Figure 15D:
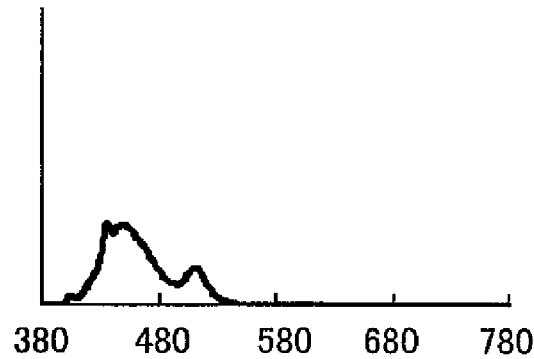
FIG. 15D is a spectrum diagram showing a spectral transmission characteristic of a blue color filter in the case where this three-band tube is used as the light source.

As shown in FIGS. 15C and 15D, the conventional configuration using the three-band tube or the four-band tube as the light source for the backlight device has presented a problem that a blue component is mixed into a pixel that is to be displayed in green, and a green component is mixed into a pixel that is to be displayed in blue. This is caused by the fact that a spectral transmission curve of a blue color filter partially overlaps a wavelength region of green and a spectral transmission curve of a green color filter partially overlaps a wavelength region of blue. Particularly, the human eye has high sensitivity to a wavelength component of green, so that an adverse effect exerted on image quality when a green component is mixed into a pixel of blue has been recognized to be considerable.

With respect to this problem, in the configuration according to the present preferred embodiment, when displaying pixels corresponding to the blue color filter, only the cold cathode fluorescent tubes 9RB that do not have a wavelength component of green are switched on, and thus even though a spectral transmission curve of a blue color filter partially overlaps a wavelength region of green, there is no possibility that an emission spectrum occurs in the wavelength region of green, thereby preventing the occurrence of color mixing. This achieves an improvement in color purity.

Figure 6A:
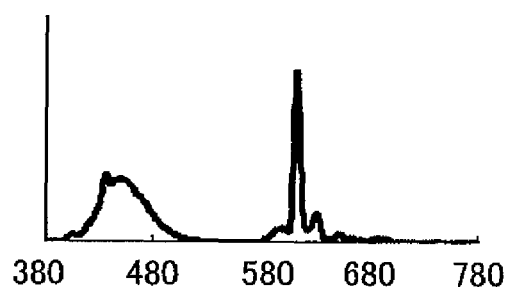
FIG. 6A is a spectrum diagram showing a spectral characteristic of a cold cathode fluorescent tube 9RB.
Figure 6B:
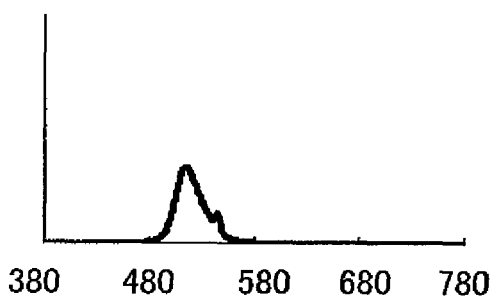
FIG. 6B is a spectrum diagram showing a spectral characteristic of a cold cathode fluorescent tube 9G.
Figure 6C:
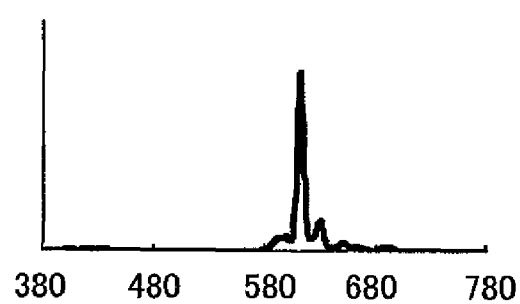
Figure 6D:
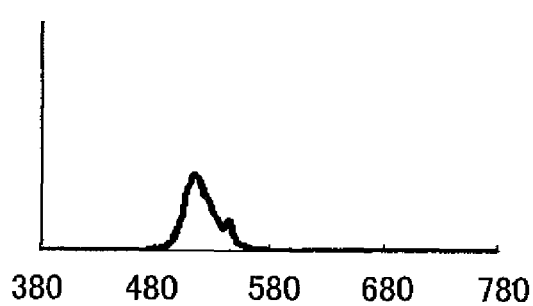
Figure 6E:
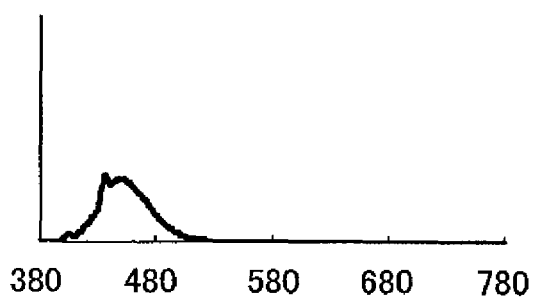

Particularly, by the above-described configuration in which the pixels of red and blue are set so as to perform the black display during a time period (first half of one frame) in which the pixels of green are displayed and the pixels of green are set so as to perform the black display during a time period (latter half of one frame) in which the pixels of red and blue are displayed, the colors of red, green, and blue can be separated completely without being mixed as shown in FIGS. 6C to 6E. FIG. 6A is a spectrum diagram showing a spectral characteristic of the cold cathode fluorescent tube 9RB, and FIG. 6B is a spectrum diagram showing a spectral characteristic of the cold cathode fluorescent tube 9G. FIG. 6C is a spectrum diagram showing a spectral characteristic of light that is transmitted through a pixel corresponding to the red color filter when the cold cathode fluorescent tubes 9RB are switched on. FIG. 6D is a spectrum diagram showing a spectral characteristic of light that is transmitted through a pixel corresponding to the green color filter when the cold cathode fluorescent tubes 9G are switched on. FIG. 6E is a spectrum diagram showing a spectral characteristic of light that is transmitted through a pixel corresponding to the blue color filter when the cold cathode fluorescent tubes 9RB are switched on.

Figure 7:
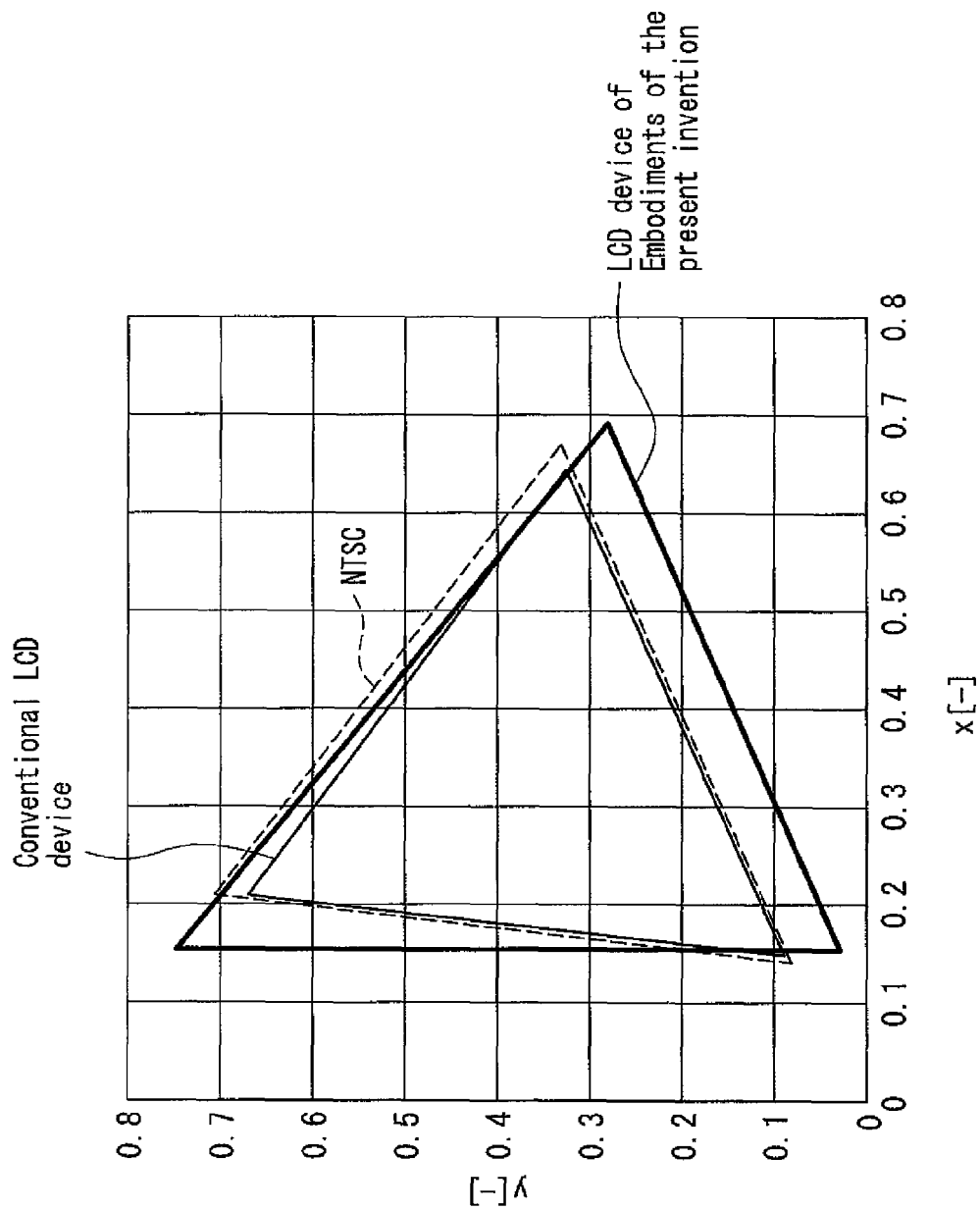
FIG. 7 is a chromaticity diagram (NTSC ratio) showing color reproduction ranges in the CIE 1931 color system of a conventional liquid crystal display device using a three-band tube as a light source and the liquid crystal display device according to a preferred embodiment of the present invention.

FIG. 7 is a chromaticity diagram (NTSC ratio) showing color reproduction ranges in the CIE 1931 color system of a conventional liquid crystal display device using a three-band tube as a light source for a backlight and the liquid crystal display device 2 according to the present preferred embodiment. As the three-band tube used as the light source for the backlight in the conventional liquid crystal display device, a fluorescent tube was used in which a phosphor having an emission spectrum in a wavelength region of green (in the vicinity of 516 nm) (NP-108 manufactured by Nichia Corporation), a phosphor having an emission spectrum in a wavelength region of red (in the vicinity of 611 nm) (NP-340 manufactured by Nichia Corporation), and a phosphor having an emission spectrum in a wavelength region of blue (in the vicinity of 450 nm) (NP-107 manufactured by Nichia Corporation) were sealed.

As can be seen from FIG. 7, compared with the conventional liquid crystal display device, the liquid crystal display device 2 according to the present preferred embodiment exhibited highly improved color purity. As for a NTSC ratio, the conventional liquid crystal display device had a ratio of 87.4%, whereas the liquid crystal display device 2 according to the present embodiment had a ratio of 121.3%. Thus, when compared with the conventional liquid crystal display device using the three-band tube or the four-band tube as the light source for the backlight device, the liquid crystal display device 2 of the present preferred embodiment was proved to improve color purity. Further, although a supply of the gate pulse at a cycle of 0.5 frame increases a refreshing rate of a screen, since liquid crystal has a response speed that can conform to the refreshing rate at a frame rate of NTSC, PAL or the like, the liquid crystal display device 2 according to the present preferred embodiment still can be realized sufficiently.

Further, in the backlight device 8 according to the present preferred embodiment, the diffusion plate 10 is provided with diffusion members (diffuser) 10b so as to diffuse light of green. Accordingly, even when the backlight device 8 is made to correspond with high-quality display of moving images, it is capable of preventing light of green from becoming particularly visible. Therefore, the backlight device 8 according to the present preferred embodiment can prevent the luminous quality from declining.

Further, in the backlight device 8 according to the present preferred embodiment, the diffusion members 10b are arranged along a longitudinal direction of the cold cathode fluorescent tubes 9 and disposed so as to oppose the cold cathode fluorescent tubes 9G, which results in that the diffusion members 10b are disposed so as to cover portions of effective light-emitting regions of cold cathode fluorescent tubes 9G. As a result, the diffusion members 10b can diffuse light of green without fail, whereby the backlight device 8 of the present preferred embodiment is surely capable of preventing the luminous quality from declining.

Figure 8A:
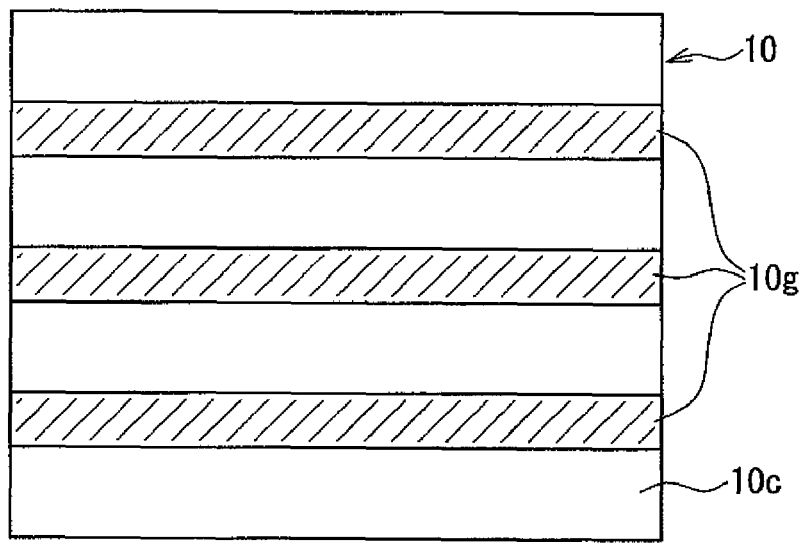
FIGS. 8A and 8B are diagrams illustrating an effect of a diffusion member provided on a backlight device shown in FIG. 2.

Specifically, in a diffusion plate 10 not including diffusion members 10b, as shown in FIG. 8A, light of green, which is relatively more visible to a user's eye, appears on a light-emitting surface 10c thereof, which may cause lamp images of the cold cathode fluorescent tubes 9G indicated by hatched areas in FIG. 8A.

Figure 8B:
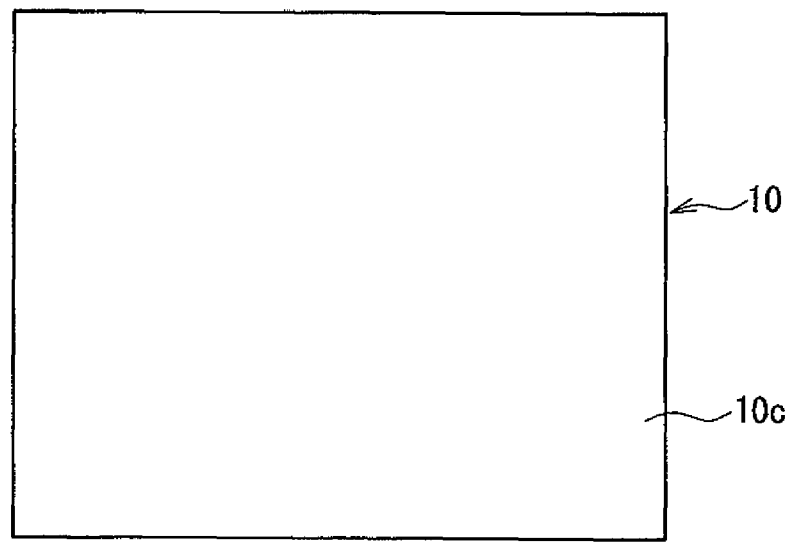

In contrast, the backlight device 8 according to the present preferred embodiment diffuses light of green at the diffusion members 10b, which can prevent the occurrence of the above-mentioned lamp images, and provide light-emitting surface 10c as shown in FIG. 8B. Thus, the backlight device 8 can surely prevent the luminous quality from declining. Since the occurrence of lamp images on the light-emitting surface 10c can be prevented in this manner, the quality of the display of white by the liquid crystal display device 2 can easily be improved accordingly.

Further, as described above, the backlight device 8 according to the present preferred embodiment can prevent a decline in luminous quality even when both of an improvement in color purity and a configuration corresponding with high-quality display of moving images are pursed at the same time. Therefore, the liquid crystal display device 2 and the television receiver 1 that are capable of performing high-quality display of moving images and exhibiting superior display quality can easily be configured.

Second Preferred Embodiment

Figure 9:
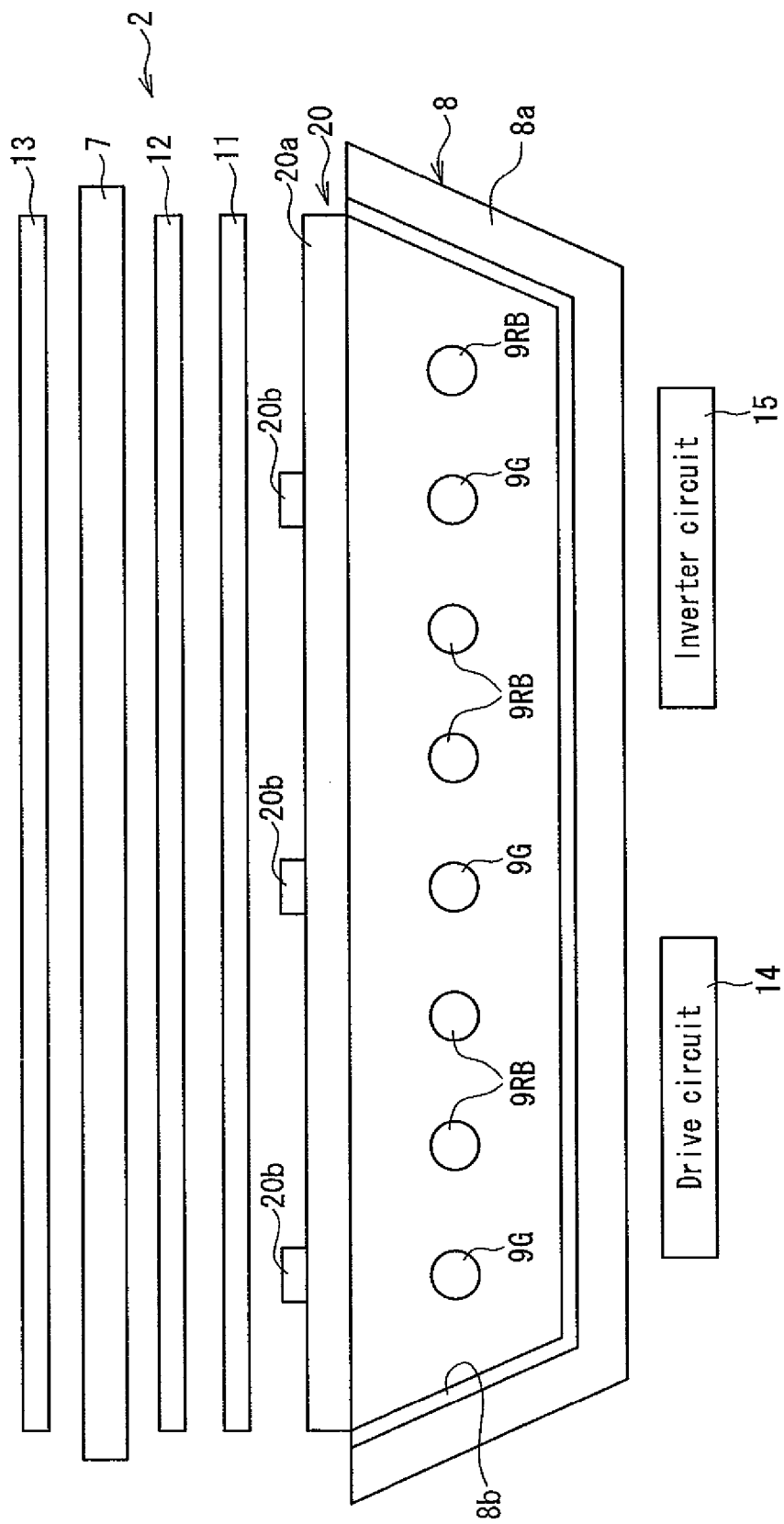
FIG. 9 is a diagram illustrating a configuration of main portions of a liquid crystal display device according to Second Preferred Embodiment of the present invention.

FIG. 9 is a diagram illustrating a configuration of main portions of a liquid crystal display device according to Second Preferred Embodiment of the present invention. In this drawing, the main difference of the present preferred embodiment from First Preferred Embodiment described above is that diffusion members each of which has a rectangular cross section are disposed on straight lines falling on the cold cathode fluorescent tubes (first light sources) with a diffusion plate being interposed therebetween. It should be noted that the same elements as those of First Preferred Embodiment described above are designated by the same reference numerals and duplicate descriptions of the same are omitted.

To go into more details, as in one example shown in FIG. 9, in a backlight device 8 of the present preferred embodiment, a diffusion plate 20 is provided so as to cover an opening of the casing 8a. This diffusion plate 20 includes a flat main body 20a, and diffusion members 20b defining the diffuser, each of which has a rectangular cross section.

Further, the diffusion members 20b are disposed on a side (non-light source side) of the diffusion plate main body 20a that is opposite to the cold cathode fluorescent tubes 9G side thereof, so as to be provided on straight lines that fall on the cold cathode fluorescent tubes 9G vertically as viewed in the drawing. Still further, the diffusion members 20b are arranged so as to cover portions of the effective light-emitting regions in the lengthwise direction of the cold cathode fluorescent tubes 9G, thereby mainly diffusing light of green that comes from the cold cathode fluorescent tubes 9G and is diffused by the diffusion plate main body 20a. The diffusion members 20b are thus configured to diffuse light of green, which is relatively more visible to a user's eye, thereby preventing lamp images from being created, as is the case with First Preferred Embodiment.

With the above-described configuration, the backlight device 8 according to the present preferred embodiment is capable of having the same functions and achieving the same effects as those of First Preferred Embodiment. More specifically, with the backlight device 8 according to the present preferred embodiment, unlike the above-described conventional example, it is possible to prevent the luminous quality from declining even when both of an improvement in color purity and a configuration corresponding with a high-quality display of moving images are pursued at the same time. Therefore, with use of the backlight device 8 according to the present preferred embodiment, as is the case with that of First Preferred Embodiment, it is possible to easily configure the high-performance liquid crystal display device 2 and the high-performance television receiver 1 that are capable of performing high-quality display of moving images and exhibit superior display quality.

Third Preferred Embodiment

Figure 10:
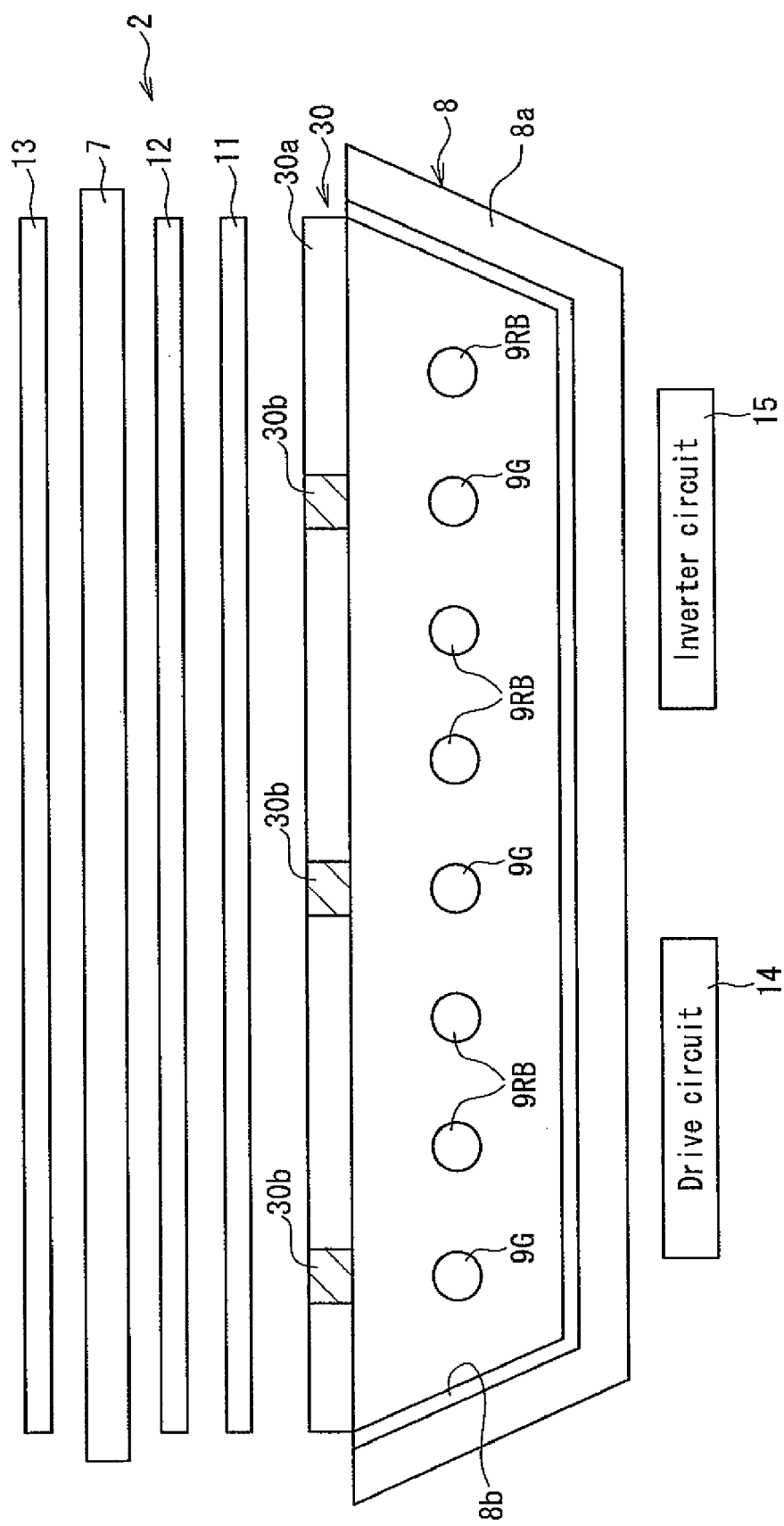
FIG. 10 is a diagram illustrating a configuration of main portions of a liquid crystal display device according to Third Preferred Embodiment of the present invention.

FIG. 10 is a diagram illustrating a configuration of main portions of a liquid crystal display device according to Third Preferred Embodiment of the present invention. In this drawing, the main difference of the present preferred embodiment from the First Preferred Embodiment described above is that in a diffusion plate, a diffuse transmittance in portions thereof that face cold cathode fluorescent tubes (first light sources) is preferably smaller than a diffuse transmittance in the other portions of the diffusion plate, so that the former portions function as diffusion members (diffuser) inside the diffusion plate. It should be noted that the same elements as those of First Preferred Embodiment described above are designated by the same reference numerals and duplicate descriptions of the same are omitted.

To go into more detail, as shown in FIG. 10, in a backlight device 8 of the present preferred embodiment, a diffusion plate 30 is arranged so as to cover an opening of the casing 8a. This diffusion plate 30 includes a flat main body 30a, and diffusion portions 30b of the diffuser, provided in the diffusion plate main body 30a at positions opposite to the cold cathode fluorescent tubes 9G. In other words, the diffusion plate main body 30a is configured so that portions that face effective light-emitting regions extended in the lengthwise direction of the three cold cathode fluorescent tubes 9G are opened, whereby the diffusion plate main body 30a has slit-like apertures; and in the apertures, the diffusion portions 30b are provided integrally with the diffusion plate main body 30a.

Further, the diffusion portions 30b are configured to have a diffuse transmittance that is about 1% to about 15% smaller, for example, than the diffuse transmittance of the diffusion plate main body 30a, and to diffuse mainly the light of green from the cold cathode fluorescent tubes 9G. The diffusion portions 30b are thus configured to diffuse light of green, which is relatively more visible to a user's eye, thereby preventing lamp images from being created, as is the case with First Preferred Embodiment.

With the above-described configuration, the backlight device 8 according to the present preferred embodiment is capable of having the same functions and achieving the same effects as those of First Preferred Embodiment. More specifically, with the backlight device 8 according to the present preferred embodiment, unlike the above-described conventional example, it is possible to prevent the luminous quality from declining even when both of an improvement in color purity and a configuration corresponding with a high-quality display of moving images are pursued at the same time.

Therefore, with use of the backlight device 8 according to the present preferred embodiment, as is the case with that of First Preferred Embodiment, it is possible to easily configure the high-performance liquid crystal display device 2 and the high-performance television receiver 1 that are capable of performing high-quality display of moving images and exhibiting superior display quality.

Further, with the backlight device 8 according to the present preferred embodiment in which the diffusion plate 30 incorporating the diffusion portions (diffuser) 30*b* is used, operations for the incorporation of the diffuser into the backlight device 8 and operations for the assembly of the backlight device 8 can be simplified easily. Still further, unlike the above-described preferred embodiments, a separate space where the diffuser is to be provided is not needed, and hence an increase in the size of the backlight device 8 due to the provision of the diffuser can be prevented. As a result, with the backlight device 8 according to the present preferred embodiment, it is possible to easily thin the liquid crystal display device 2 and the television receiver 1.

Fourth Preferred Embodiment

Figure 11:
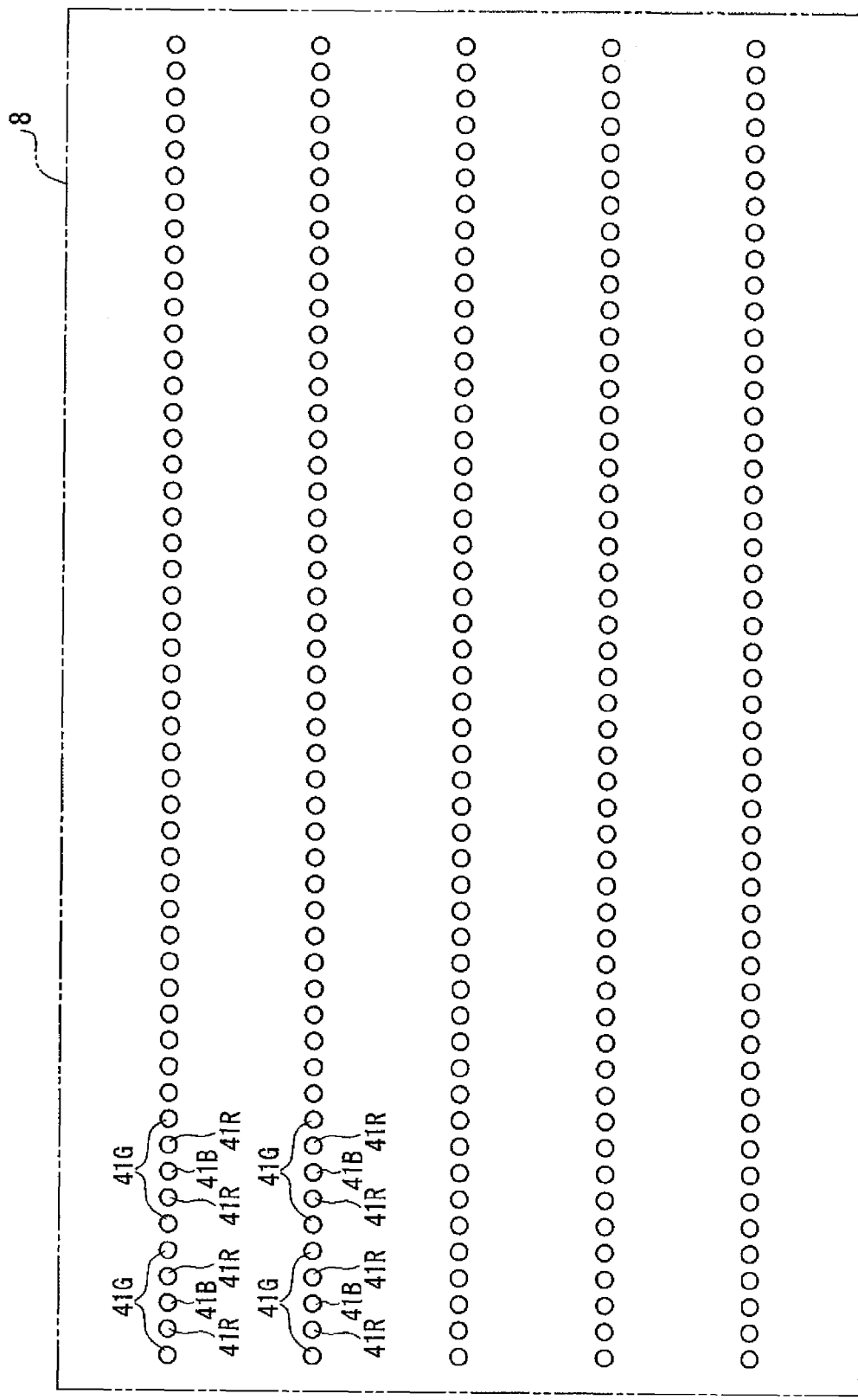
FIG. 11 is a diagram illustrating a configuration of main portions of a backlight device according to Fourth Preferred Embodiment of the present invention.

FIG. 11 is a diagram illustrating a configuration of main portions of a backlight device according to Fourth Preferred Embodiment of the present invention. In the drawing, the main difference of the present preferred embodiment from First Preferred Embodiment described above is that light emitting diodes are used as light sources, in place of the cold cathode fluorescent tubes. It should be noted that the same elements as those of First Preferred Embodiment described above are designated by the same reference numerals and duplicate descriptions of the same are omitted.

To go into more detail, as shown in FIG. 11, in a backlight device 8 of the present preferred embodiment, light emitting diodes 41R, 41G, and 41B emitting lights of RGB, respectively, are disposed regularly on a bottom surface of the casing 8*a* (FIG. 2). More specifically, as shown in FIG. 11, two red light emitting diodes 41R are provided between two green light emitting diodes 41G, and further, between these red light emitting diodes 41R, one blue light emitting diode 41B is provided. Then, such sets, each of which includes these five light emitting diodes 41R, 41G, and 41B, are arrayed repetitively and sequentially in one line in the horizontal direction as viewed in the drawing. Still further, as shown in FIG. 11, five of such linear arrays composed of the light emitting diodes 41R, 41G, and 41B are arrayed in the vertical direction as viewed in the drawing.

In the backlight device 8 according to the present preferred embodiment, in the first half of each frame period, only the green light emitting diodes 41G are switched on, while the red and blue light emitting diodes 41R and 41B are switched off. On the other hand, in the latter half of the each frame period, the red and blue light emitting diodes 41R and 41B are switched on, while the green light emitting diodes 41G are switched off.

It should be noted that if the screen size of the liquid crystal display device 2 is of a 37-V type, for example, about 305 light emitting diodes in total are preferably used, for example. Alternatively, light emitting diodes of a so-called three-in-one (3 in 1) type or the like, configured so that light emitting elements of three colors of RGB are contained in one package, may be used.

Still further, in the backlight device 8 of the present preferred embodiment, the diffusion plate is used in which the diffuser portions or members are provided integrally at positions corresponding to positions where green light emitting diodes 41G are provided. In other words, the green light emitting diodes 41G are arrayed linearly in the vertical direction as viewed in FIG. 11, and for example, light diffusion members having triangular cross sections as shown in FIG. 2 are provided integrally with a diffusion plate at positions opposite to the light emitting diodes 41G arrayed linearly (not shown). The foregoing diffusion members are to diffuse light of green from the light emitting diodes 41G, as in First Preferred Embodiment.

With the above-described configuration, the backlight device 8 according to the present preferred embodiment is capable of having the same functions and achieving the same effects as those of First Preferred Embodiment. More specifically, with the backlight device 8 according to the present preferred embodiment, unlike the above-described conventional example, it is possible to prevent the luminous quality from declining even when both of an improvement in color purity and a configuration corresponding with a high-quality display of moving images are pursued at the same time. Therefore, with use of the backlight device 8 according to the present preferred embodiment, as is the case with that of First Preferred Embodiment, it is possible to easily configure the high-performance liquid crystal display device 2 and the high-performance television receiver 1 that are capable of performing high-quality display of moving images and exhibiting superior display quality.

Fifth Preferred Embodiment

Figure 12:
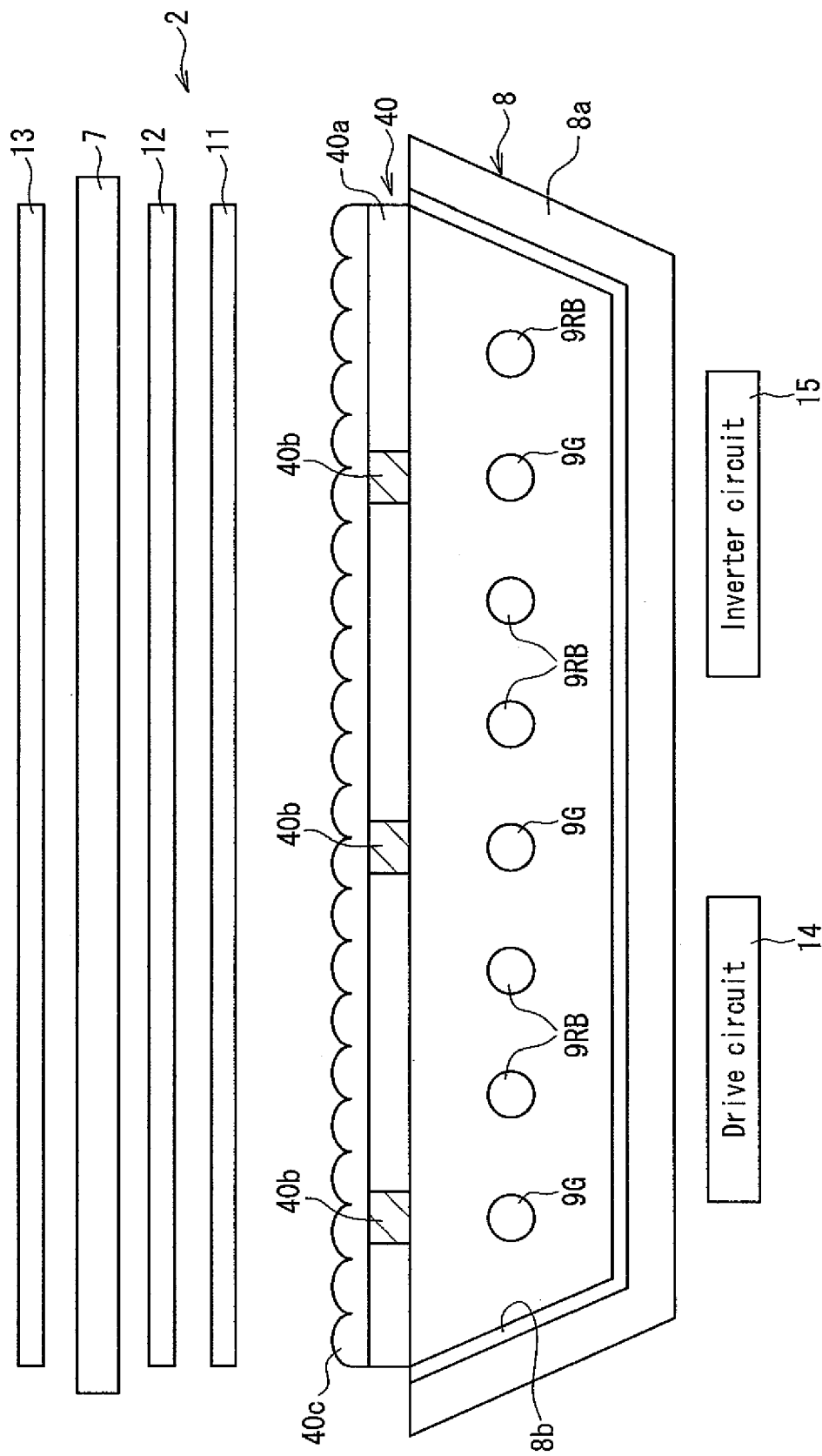
FIG. 12 is a diagram illustrating a configuration of main portions of a liquid crystal display device according to Fifth Preferred Embodiment of the present invention.

FIG. 12 is a diagram illustrating a configuration of main portions of a liquid crystal display device according to Fifth Preferred Embodiment of the present invention. In this drawing, the main difference of the present preferred embodiment from Third Preferred Embodiment described above is that a diffusion plate provided with a lenticular lens is used. It should be noted that the same elements as those of First Preferred Embodiment described above are designated by the same reference numerals and duplicate descriptions of the same are omitted.

To go into more detail, as shown in FIG. 12, in a backlight device 8 of the present preferred embodiment, a diffusion plate 40 is arranged so as to cover an opening of the casing 8*a*. This diffusion plate 40 includes, as is the case with Third Preferred Embodiment, a flat main body 40*a*, and diffusion portions 40*b* defining the diffuser, provided in the diffusion plate main body 40*a* at positions opposite to the cold cathode fluorescent tubes 9G.

The diffuse transmittance of the diffusion portions 40*b* is preferably about 1% to about 15% smaller, for example, than the diffuse transmittance of the diffusion plate main body 40*a*, and is configured to diffuse mainly the light of green from the cold cathode fluorescent tubes 9G. The diffusion portions 40*b* are thus configured to diffuse light of green, which is relatively more visible to a user's eye, thereby preventing lamp images from being created, as is the case with Third Preferred Embodiment.

Still further, in the diffusion plate 40 of the present preferred embodiment, a lenticular lens 40*c* as a lens structure is provided integrally with the diffusion plate main body 40*a*, on a liquid crystal panel 7 side thereof. The lenticular lens 40*c* has a structure in which a plurality of lenses each of which has a substantially semicircular shape are arrayed sequentially in the horizontal direction as viewed in the drawing, and is configured so as to focus illumination light onto the liquid crystal panel 7. In the diffusion plate 40, an improvement in the front brightness of the illumination light is to be achieved by this lenticular lens 40*c*.

With the above-described configuration, the backlight device 8 according to the present preferred embodiment is capable of having the same functions and achieving the same effects as those of Third Preferred Embodiment. Besides, since the front brightness of illumination light coming through the diffusion plate 10 is improved by the lenticular lens (lens structure) 40c in the backlight device 8 of the present preferred embodiment, the backlight device 8 is made to have high performance.

Sixth Preferred Embodiment

Figure 13:
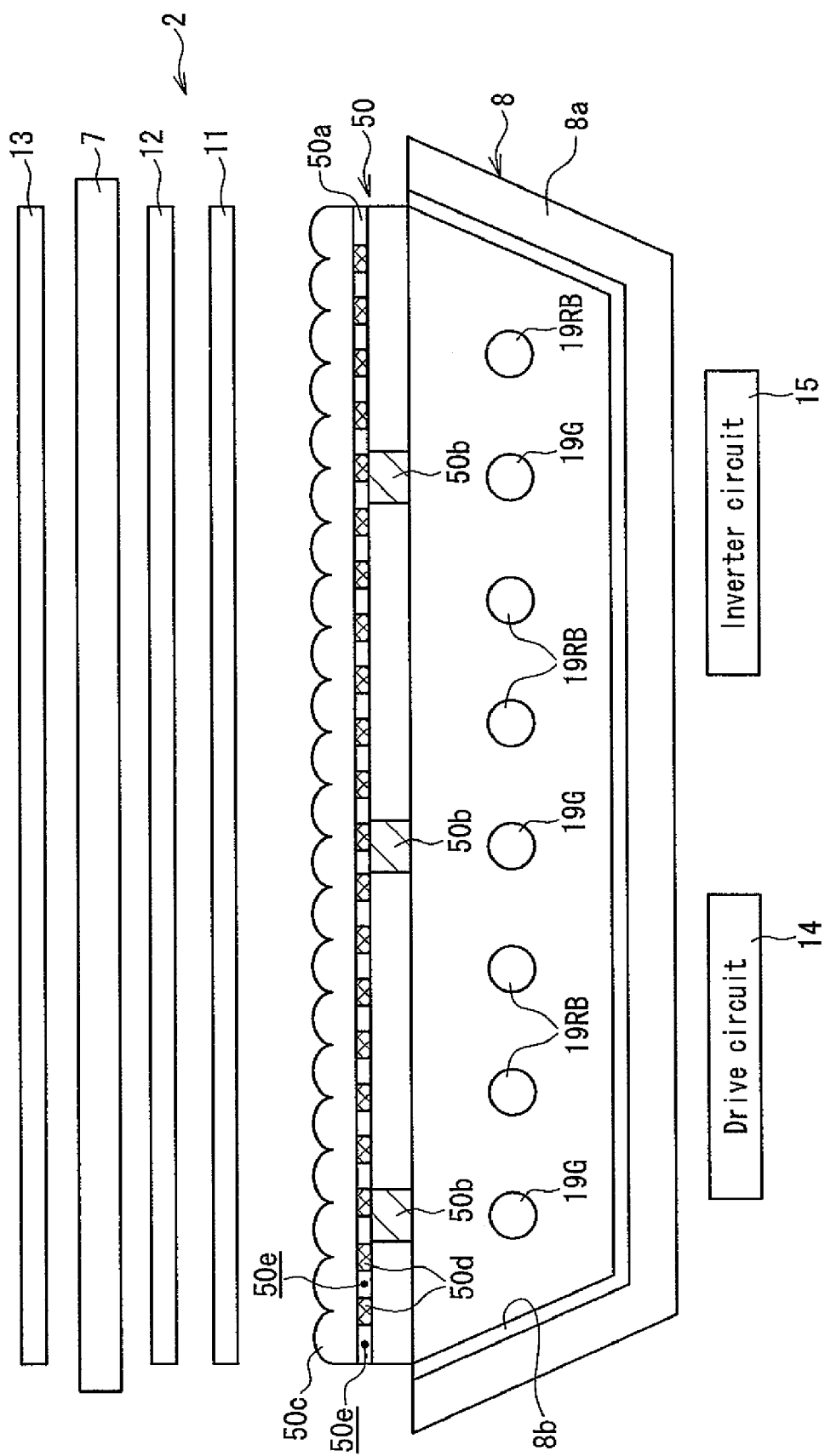
FIG. 13 is a diagram illustrating a configuration of main portions of a liquid crystal display device according to Sixth Preferred Embodiment of the present invention.
Figure 14:
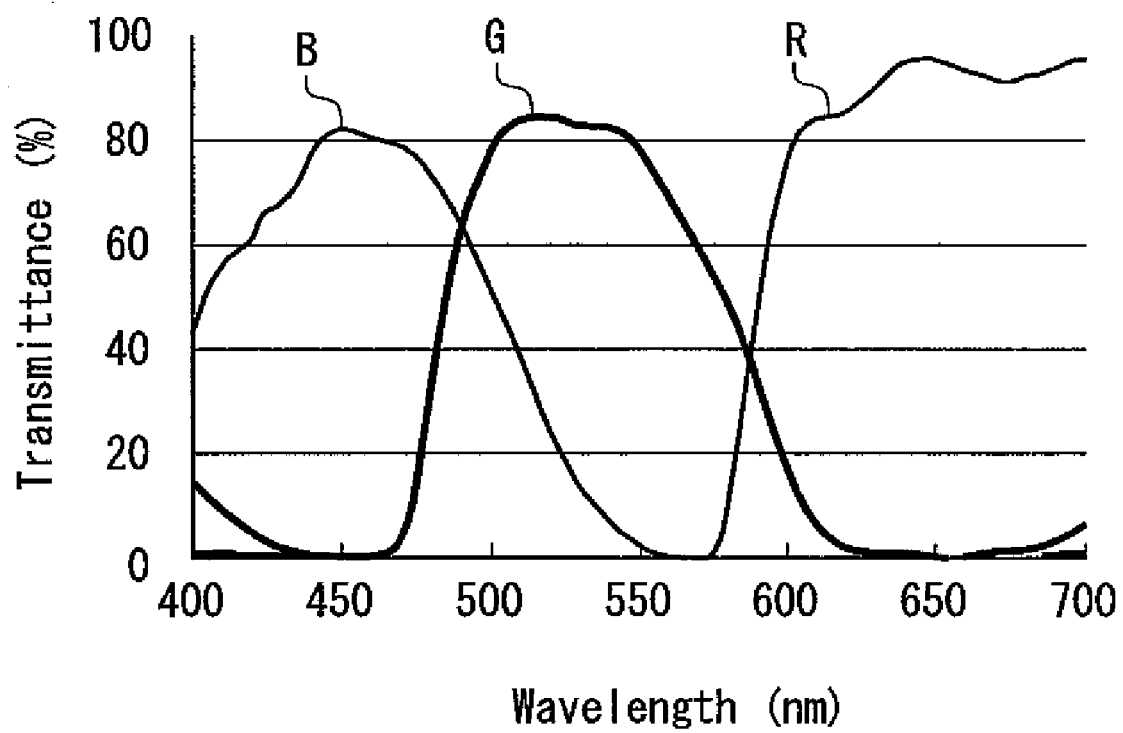
FIG. 14 is a spectrum diagram showing spectral transmission characteristics of color filters of three colors of RGB.

FIG. 13 is a diagram illustrating a configuration of main portions of a liquid crystal display device according to Sixth Preferred Embodiment of the present invention. In the drawing, the main difference of the present preferred embodiment from Third Preferred Embodiment is that a diffusion plate provided with a lenticular lens and a reflection layer is used. It should be noted that the same elements as those of First Preferred Embodiment described above are designated by the same reference numerals and duplicate descriptions of the same are omitted.

To go into more detail, as shown in FIG. 13, in the backlight device 8 of the present preferred embodiment, a diffusion plate 50 is arranged so as to cover an opening of the casing 8a. Further, in the backlight device 8 of the present preferred embodiment, in place of the cold cathode fluorescent tubes 9G and 9RB, hot cathode fluorescent tubes 19G and 19RB are provided as first and second light sources, respectively, so as to emit light of green, and light of red and blue, respectively. As the hot cathode fluorescent tubes 19G and 19RB, those having a diameter of about 5 mm to about 26 mm each, thereby having excellent light-emission efficiency, are used.

Further, the diffusion plate 50, as is the case with that of Third Preferred Embodiment, includes a flat main body 50a, and diffusion portions 50b, defining the diffuser, provided in the diffusion plate main body 50a at positions opposite to the hot cathode fluorescent tubes 19G.

The diffusion portions 50b have a diffuse transmittance that preferably is about 1% to about 15% smaller, for example, than the diffuse transmittance of the diffusion plate main body 50a, and are configured to diffuse mainly the light of green from the hot cathode fluorescent tubes 19G. The diffusion portions 50b are thus configured to diffuse light of green, which is relatively more visible to a user's eye, thereby preventing lamp images from being created, as is the case with Third Preferred Embodiment.

Further, in the diffusion plate 50 of the present preferred embodiment, a lenticular lens 50c as a lens structure, reflection layers 50d (illustrated by cross hatching in the drawing) are provided integrally with the diffusion plate main body 50a on the liquid crystal panel 7 side of the diffusion plate 50. The lenticular lens 50c has a structure in which a plurality of lenses each of which has a substantially semicircular shape are arrayed sequentially in the horizontal direction as viewed in the drawing, and is configured so as to focus the illumination light onto the liquid crystal panel 7. In the diffusion plate 50, an improvement in the front brightness of the illumination light is to be achieved by this lenticular lens 50c.

The reflection layers 50d are disposed so as to face centers of two adjacent unit lenses of the lenticular lens 50c, and are disposed between the diffusion plate main body 50a and the lenticular lens 50c in such a manner that the reflection layers 50d and air layers 50e are arranged alternately. The reflection layers 50d are configured so that light reflected in the lenticular lens 50c toward the diffusion plate main body 50a side is included into illumination light and is reflected again toward the lenticular lens 50c side.

With the above-described configuration, the backlight device 8 of the present preferred embodiment is capable of having the same functions and achieving the same effects as those of Third Preferred Embodiment. Besides, in the backlight device 8 of the present preferred embodiment, the front brightness of illumination light coming through the diffusion plate 50 is improved by the lenticular lens (lens structure) 50c while the light utilization efficiency is improved by the reflection layers 50d. Therefore, the backlight device 8 is made to have high performance more easily.

It should be noted that all the above-described preferred embodiments are illustrative and not limiting. The technical scope of the present invention is specified by the scope of the claims, and any modification falling in the scope of the configuration and equivalent described therein also fall in the technical scope of the present invention.

For example, though the above description explains cases where preferred embodiments of the present invention are applied to a transmission-type liquid crystal display device, the backlight device of the present invention is not limited to these cases; the backlight device of preferred embodiments of the present invention may be applied to various types of display devices each of which has a non-light-emitting type display portion for displaying information such as images and letters by utilizing light from a light source. More specifically, the backlight device of preferred embodiments of the present invention can suitably be applied to a semi-transmission type liquid crystal display device, or to a projection-type display device in which a liquid crystal panel is used as a light bulb.

Still further, alternatively, preferred embodiments of the present invention can be used suitably as a film viewer irradiating light to a radiograph, a light box for irradiating light to a picture negative to make it easy to recognize the negative visually, and a backlight device of a light-emitting device that lights up a signboard, an advertisement set on a wall surface in a station or the like.

Still further, though the above description explains cases where the diffusion plate and the diffusion members or portions as the diffuser preferably are provided integrally, the diffuser according to various preferred embodiments of the present invention is required only to diffuse light of a first color or light of a second color, and it is possible to use a diffuser that is separately configured with respect to the diffusion plate with use of a different material.

However, the diffusion plate and the diffuser preferably are configured integrally with each other as is the case with the above-described preferred embodiments, since the diffusion plate and the diffuser can be installed at once in a backlight device, whereby operations for the assembly of the backlight device can be simplified easily.

The above description explains a configuration where the diffuser preferably diffuses light of green from the first light source, among the first light source emitting light of green and the second light source emitting light of red and blue, but the diffuser of the present invention is not limited to this. The diffuser may be configured to diffuse light of red and blue from the second light source. More specifically, in the case where the second light source is made more visible to a user than the first light source by increasing a value of electric current supplied to the second light source as compared with a value of electric current supplied to the first light source, or by arranging a plurality of second light sources at non-uniform intervals, i.e., an uneven pitch, the above-described light from the second light source may be diffused by the diffuser.

Still further, though the descriptions of First and Second Preferred Embodiments explain a case where diffusion members each of which has a triangular cross section are disposed on the cold cathode fluorescent tube side (light source side) and a case where diffusion members each of which has a rectangular cross section are disposed on the liquid crystal panel side (non-light-source side), respectively, the diffuser of the present invention may be disposed on at least one of the light source side and the non-light-source side of the diffusion plate, and the shape and location of the diffuser are not limited to those described above at all.

More specifically, for example, the diffuser including diffusion members or potions, each of which preferably has a washboard-like shape cross section, may be disposed at positions opposite to first light sources or second light sources. Alternatively, the diffuser of First to Third Preferred Embodiments described above may be combined as required. For example, the configuration may be such that diffusion portions having a smaller diffuse transmittance, as in Third Preferred Embodiment, are provided in a surface portion of the diffusion plate opposite to the first light sources or the second light sources, while diffusion members each of which has a triangular cross section are disposed on the diffusion portions, on a non-light-source side thereof.

Though the descriptions of First to Third and Fifth Preferred Embodiments explain cases where cold cathode fluorescent tubes are used, it is possible to use hot cathode fluorescent tubes used in Sixth Preferred Embodiment may be used in the foregoing preferred embodiments. Alternatively, other discharge fluorescent tubes such as xenon fluorescent tubes can be used. In the case where such discharge fluorescent tubes are used, the backlight device can be configured to be a low-cost, low-power-consumption backlight device. Besides, in the case where cold cathode fluorescent tubes with a diameter of about 3 mm to about 4 mm each, or hot cathode fluorescent tubes with a diameter of about 5 mm to about 26 mm each are used as described above, which means that cold cathode fluorescent tubes or hot cathode fluorescent tubes having an excellent light emission efficiency are used as respective linear light sources, the low-cost, low-power-consumption backlight device can be configured more easily. Therefore, this configuration is preferable. Furthermore, phosphors specifically mentioned in the descriptions of preferred embodiments are merely illustrative examples.

Though it is described in the above that a pixel portion of green in one pixel is displayed in the first half of each frame period, while the other pixel portion of red and blue is displayed in the latter half of the frame period, the pixel portion of red and blue in one pixel may be displayed in the first half, while the other pixel portion of green may be displayed in the latter half.

Still further, although the above description explains a configuration in which two types of light sources are used, one being a type of light sources that emit light mainly having a spectrum in a wavelength region of green, and the other being a type of light sources that emit light mainly having spectra in wavelength regions of red and blue, the present invention is not limited to this configuration. More specifically, since a main cause that declines the color purity is the mixing of green and blue, only the separation of a green component and a blue component is required. Therefore, a configuration in which two types of light sources are used as light sources for a backlight device, one type being a type of light sources that emit light mainly having a spectrum in a wavelength region of blue, and the other type being a type of light sources that emit light mainly having spectra in wavelength regions of red and green, is suitable as a preferred embodiment of the present invention, too, and this configuration achieves similar effects as those of each of the above-described preferred embodiments. Still further, in the case where LEDs are used as light sources for a backlight device, the backlight device may be configured so that light emitting diodes of blue are caused to emit light in one of the first and latter halves of each frame period, while light emitting diodes of red and those of green are caused to emit light at the same time in the other half of each frame period. With this configuration also, similar effects as those of the above-described preferred embodiments can be achieved.

Still further, alternatively, the configuration may be such that among a group of first light sources that emit light of the first color and a group of second light sources that emit light of the second color that is complementary to the first color, the light sources of one of these groups are cold cathode fluorescent tubes, and the light sources of the other group are LEDs. For example, though this is an illustrative example, the configuration may be such that cold cathode fluorescent tubes are used as light sources that emit light mainly having a spectrum in a wavelength region of green, while LEDs including red light emitting elements and blue light emitting elements may be used as light sources that emit light mainly having spectra in wavelength regions of red and blue. In other words, in the preferred embodiments of the present invention, the designs of the number of light sources and the combination of types of light sources can be varied appropriately within the scope with which the effects of preferred embodiments of the present invention can be achieved.

Still further, though the above description mentions a configuration in which color filters of three primary colors of RGB is provided, the present invention may be embodied in a configuration including color filters of three colors of CMY. Still further, color filters applicable to the present invention are not limited to color filters of three colors; a configuration including color filters of four or more colors, which include any color other than the three colors (RGB or CMY) that turn into white color when mixed, also falls in the technical scope of the present invention.

Still further, alternatively, the configuration may be such that at one of the first half and the latter half of the time period in which one image is displayed, the plurality of the first light sources are switched on successively in an order of arrangement so as to be synchronized with an application of the selection signal to each of scanning lines, and at the other of the first half and the latter half of the time period in which one image is displayed, the plurality of the second light sources are switched on successively in an order of arrangement so as to be synchronized with the application of the selection signal to each of the scanning lines. In the case of such a configuration, it is possible to prevent the first light source and the second light source arranged in close proximity to each other from emitting light simultaneously, thereby preventing light of the first color and light of the second color from being mixed with each other. Thus, the color purity can be improved further.

Still further, in the case where light of the first color and light of the second color are prevented from being mixed with each other as described above, the provision of color filters of G or B can be omitted, as is the case where the insertion of black is carried out. The reason is as follows. In the case where in the above-described preferred embodiments, the light sources emitting only light of green are used as the first light sources, when the first light sources are switched on, the second light sources are not switched on, and light of red and blue is not emitted. As a result, without provision of green color filters, light of green from the first light sources is caused to be transmitted through only pixels for green, whereby only images of green can be displayed. Likewise, in the case where light sources emitting only light of blue are used, the provision of blue color filters can be omitted.

A backlight device, a display device, and a television receiver according various preferred embodiments of the present invention are useful as a high-performance backlight device, as well as a display device and a television receiver capable of easily performing the high-quality display of moving images, respectively, since a backlight device capable of improving the color purity, corresponding with the high-quality display of moving images, and preventing the luminous quality from declining is used therein.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A backlight device comprising:
a plurality of light sources; and
a diffusion plate arranged to diffuse light from the plurality of light sources; wherein
the plurality of light sources include:
a first light source that emits light of a first color; and
a second light source that is arranged so as to be switched independently from the first light source and to emit light of a second color complementary to the first color;
the backlight device comprising a diffuser that is provided on at least one side of a light source side and a non-light source side of the diffusion plate so as to diffuse the light of the first color or the light of the second color; and
the diffuser is only disposed directly opposite to either the first light source or the second light source.

2. The backlight device according to claim 1, wherein the diffuser is disposed opposite to the first light source or the second light source.

3. The backlight device according to claim 1, wherein the diffuser is disposed on a straight line falling on the first light source or the second light source, with the diffusion plate being interposed therebetween.

4. The backlight device according to claim 1, wherein the diffuser is integral with the diffusion plate.

5. The backlight device according to claim 1, wherein the diffuser is provided in the inside of the diffusion plate by setting a diffuse transmittance at a portion of the diffusion plate opposite to the first light source or the second light source smaller than a diffuse transmittance at the other portion.

6. The backlight device according to claim 1, wherein the diffusion plate is made of polycarbonate or methyl methacrylate styrene copolymer.

7. The backlight device according to claim 1, wherein the diffusion plate is provided with a lens structure.

8. The backlight device according to claim 1, wherein the diffusion plate is provided with a reflection layer interposed between a lens structure and a main body of the diffusion plate.

9. The backlight device according to claim 1, wherein the light of the first color mainly has a spectrum in a wavelength region of green, and the light of the second color mainly has spectra in wavelength regions of red and blue.

10. The backlight device according to claim 1, wherein the light of the first color mainly has a spectrum in a wavelength region of blue, and the light of the second color mainly has spectra in wavelength regions of red and green.

11. The backlight device according to claim 1, wherein the first light source and the second light source are cold cathode fluorescent tubes or hot cathode fluorescent tubes.

12. The backlight device according to claim 1, wherein the first light source and the second light source are cold cathode fluorescent tubes with a diameter of about 3 mm to about 4 mm.

13. The backlight device according to claim 1, wherein the first light source and the second light source are hot cathode fluorescent tubes with a diameter of about 5 mm to about 26 mm.

14. The backlight device according to claim 11, wherein a plurality of the first light sources and a plurality of the second light sources are provided, and the first light sources and the second light sources are arranged alternately, one or more by one or more.

15. The backlight device according to claim 1, wherein the first light source is a green light emitting diode, and the second light source includes a combination of a red light emitting diode and a blue light emitting diode arranged to emit light at the same time when the red light emitting diode emits light.

16. The backlight device according to claim 1, wherein the first light source is a blue light emitting diode, and the second light source includes a combination of a red light emitting diode and a green light emitting diode that emits light at the same time when the red light emitting diode emits light.

17. A display device comprising the backlight device according to claim 1.

18. A television receiver comprising the display device according to claim 17.

* * * * *